US008608466B2

(12) United States Patent
Yokobayashi et al.

(10) Patent No.: US 8,608,466 B2
(45) Date of Patent: Dec. 17, 2013

(54) BLOW MOLD UNIT AND BLOW MOLDING APPARATUS USING THE SAME

(75) Inventors: Kazuyuki Yokobayashi, Ueda (JP); Daisaburou Takehana, Ueda (JP)

(73) Assignee: Nissei ASB Machine Co., Ltd., Nagano (JP)

( * ) Notice: Subject to any disclaimer, the term of this patent is extended or adjusted under 35 U.S.C. 154(b) by 0 days.

(21) Appl. No.: 13/561,725

(22) Filed: Jul. 30, 2012

(65) Prior Publication Data

US 2012/0294974 A1  Nov. 22, 2012

Related U.S. Application Data

(63) Continuation of application No. PCT/JP2010/073271, filed on Dec. 24, 2010.

(30) Foreign Application Priority Data

Jan. 29, 2010 (JP) .................................. 2010-019403

(51) Int. Cl.
*B29C 49/36* (2006.01)
*B29C 49/56* (2006.01)

(52) U.S. Cl.
USPC ............ 425/195; 425/533; 425/540; 425/541

(58) Field of Classification Search
USPC ................. 425/195, 525, 533, 540, 541, 552
See application file for complete search history.

(56) References Cited

U.S. PATENT DOCUMENTS

| 5,122,327 | A | 6/1992 | Spina |
| 5,261,809 | A | 11/1993 | Koga |
| 5,496,166 | A * | 3/1996 | Vogel et al. .................. 425/168 |
| 6,428,302 | B1 | 8/2002 | Tsau |
| 7,381,045 | B2 * | 6/2008 | Fields et al. ................ 425/182 |
| 2006/0068048 | A1 | 3/2006 | Koda et al. |
| 2007/0048399 | A1 | 3/2007 | Fields |

FOREIGN PATENT DOCUMENTS

| EP | 0284242 A2 | 9/1988 |
| JP | A-06-270235 | 9/1994 |
| JP | B-08-013501 | 2/1996 |
| JP | A-08-244103 | 9/1996 |
| JP | A-09-300444 | 11/1997 |
| JP | A-2003-231170 | 8/2003 |
| JP | A-2004-188866 | 7/2004 |
| JP | 2005007797 A | 1/2005 |
| JP | B-4319863 | 8/2009 |
| WO | WO 2008/061326 A2 | 5/2008 |

* cited by examiner

*Primary Examiner* — Robert B Davis
(74) *Attorney, Agent, or Firm* — David L. Hoffman; Hoffman Patent Group

(57) ABSTRACT

A blow mold unit includes a first and a second blow cavity split mold, and a plurality of raised-bottom molds. The blow mold unit also includes a first and a second securing plates on which the first and the second blow cavity split mold are secured, a plurality of first pressure-receiving plates respectively secured on the first and the second securing plates, a third securing plate disposed between the first and the second securing plates, the plurality of raised-bottom molds secured on the third securing plate, a plurality of shafts suspended from the third securing plate, and a plurality of second pressure-receiving plates secured on the first and the second securing plates at a position below the third securing plate.

15 Claims, 28 Drawing Sheets

BLOW MOLD UNIT AND BLOW MOLDING APPARATUS USING THE SAME

CROSS REFERENCE TO RELATED APPLICATION

This application is a continuation of International Patent Application No. PCT/JP2010/73271, having an international filing date of Dec. 24, 2010, which designated the United States and which claims priority from Japanese Patent Application No. 2010-019403 filed on Jan. 29, 2010, the entirety of both of which are incorporated herein by reference.

BACKGROUND OF THE INVENTION

1. Field of the Invention

The present invention relates to a blow mold unit and a blow molding apparatus using the same.

2. Description of the Related Art

It is necessary to use a raised-bottom mold as a blow mold when forming a blow-molded container having a bottom that protrudes inward (e.g., dome-like bottom or free-standing bottle). A raised-bottom mold that is clamped to a pair of blow cavity split molds may be required separately from the pair of blow cavity split molds.

For example, two rows of blow molds that are secured in a back-to-back arrangement (see FIGS. 5 and 6 of JP-B-8-13501) may be used. When molding a container having a raised bottom using the two rows of blow molds disclosed in FIGS. 5 and 6 of JP-B-8-13501, a blow-molded container interferes with the raised-bottom mold and breaks if the raised-bottom mold is not removed before opening one of the pair of blow cavity split molds.

The raised-bottom mold may be moved upward and downward irrespective of the number of rows of blow molds from the viewpoint of ensuring molding quality (e.g., adjustment of the orientation or the thickness of the bottom). In JP-A-6-270235, the raised-bottom mold is moved upward and downward in order to ensure impact resistance upon falling or the like.

The pair of blow cavity split molds and the raised-bottom mold are closed in synchronization. However, a blow cavity mold closing/opening (clamping) device for the pair of blow cavity split molds and a driver device for the raised-bottom mold are provided independently. Therefore, when attaching or removing the blow mold to or from the blow molding apparatus, the pair of blow cavity split molds is attached to or removed from the blow cavity split mold closing/opening device, and the raised-bottom mold is attached to or removed from the raised-bottom mold driver device.

JP-B-4319863 discloses a rotary transfer blow molding apparatus that is configured so that a transfer plate that is intermittently transferred is moved upward and downward in an injection molding station that is one of a plurality of stations.

The blow mold includes a pair of blow cavity split molds and a raised-bottom mold that are attached to or removed from a different closing/opening device. Therefore, it is difficult to handle the pair of blow cavity split molds and the raised-bottom mold as an integral unit. This results in poor attachment/removal workability.

The blow cavity mold closing/opening device is disposed on the base of the blow molding apparatus, while the raised-bottom mold closing/opening device is disposed under the base of the blow molding apparatus. Therefore, it is troublesome to exchange the raised-bottom mold under the base when attaching or removing the blow mold to or from the blow molding apparatus.

The exchange work becomes more complex when using two rows of blow molds. For example, a mold closing/opening device that closes/opens two rows of blow molds performs a single-sided operation, and the blow molds are connected using a horizontal tie rod (see FIGS. 5 and 6 of JP-B-8-13501). This is because the blow molds cannot be slidingly transferred on the base of the blow molding apparatus when using the horizontal tie rod.

SUMMARY OF THE INVENTION

Several aspects of the invention may provide a blow mold unit that makes it possible to integrally handle a pair of blow cavity split molds and a raised-bottom mold that are attached to or removed from a different driver device, and a blow molding apparatus using the same.

Several aspects of the invention may provide a blow mold unit that makes it possible to integrally handle two rows of a pair of blow cavity split molds and two rows of raised-bottom molds that are attached to or removed from a different driver device, and a blow molding apparatus using the same.

Several aspects of the invention may provide a blow mold unit that makes it possible to integrally handle two rows of a pair of blow cavity split molds that are attached to or removed from a different driver device, and a blow molding apparatus using the same.

(1) According to one embodiment of the invention, there is provided a blow mold unit that is secured on a base of a blow molding apparatus, the blow mold unit comprising:

a blow mold that includes a first blow cavity split mold, a second blow cavity split mold, and a plurality of raised-bottom molds, the first blow cavity split mold and the second blow cavity split mold being closed so that a parting surface of the first blow cavity split mold and a parting surface of the second blow cavity split mold come in contact with each other, and the plurality of raised-bottom molds respectively defining a raised-bottom shape in a plurality of cavities defined by the first blow cavity split mold and the second blow cavity split mold;

a first securing plate on which the first blow cavity split mold is secured;

a second securing plate on which the second blow cavity split mold is secured;

a plurality of first pressure-receiving plates, the plurality of first pressure-receiving plates being respectively disposed on either side of the first blow cavity split mold and either side of the second blow cavity split mold, and being respectively secured on the first securing plate and the second securing plate;

a third securing plate that is disposed between the first securing plate and the second securing plate, the plurality of raised-bottom molds being secured on a first side of the third securing plate;

a plurality of shafts that are suspended from a second side of the third securing plate that is opposite to the first side, a lower end of each of the plurality of shafts being a free end; and a plurality of second pressure-receiving plates that are secured on the first securing plate and the second securing plate at a position below the third securing plate.

According to one embodiment of the invention, the third securing plate that supports the plurality of raised-bottom molds is disposed between the first securing plate and the second securing plate on which the first blow cavity split mold, the second blow cavity split mold, the first pressure-receiving plate, and the second pressure-receiving plate are secured. The third securing plate comes in contact with the plurality of second pressure-receiving plates that are secured on the first securing plate and the second securing plate at a position below the third securing plate, and can be positioned when attaching or removing the blow mold unit. The first blow cavity split mold, the second blow cavity split mold, and the raised-bottom molds are thus integrated as a unit. The plurality of shafts that are suspended from the third securing plate and serve as a driving shaft that moves the raised-bottom molds upward and downward are separated from the raised-bottom mold driver device of the blow molding apparatus when attaching or removing the blow mold unit. The first securing plate and the second securing plate are also separated from the mold closing plate of the mold closing/opening device when attaching or removing the blow mold unit. This makes it possible to integrally attach or remove the blow mold unit to or from the blow molding apparatus.

(2) The blow mold unit may further comprise, a slide plate that slides on the base being secured on a lower end of each of the first securing plate and the second securing plate, and the free ends of the plurality of shafts being positioned above a horizontal height position of a lower side of the slide plate in a state in which the third securing plate comes in contact with the plurality of second pressure-receiving plates.

According to the above configuration, the lowermost side of the blow mold unit is formed by the slide plate, and the plurality of shafts suspended from the third securing plate do not interfere with a member of the blow molding apparatus when sliding the blow mold unit.

(3) The blow mold unit may further comprise, a connection section being formed in the free ends of two shafts among the plurality of shafts, the connection section being coupled by a coupling member to an upper end of a bottom mold driving rod that protrudes from the base.

According to the above configuration, a downward driving force can be transmitted to the two shafts via the coupling members when the bottom mold driving rods are moved downward, so that the raised-bottom molds can be moved downward. Since the two shafts can be connected to or disconnected from the upper end of the driving rods using the coupling members, the blow mold unit can be easily exchanged. Moreover, the coupling member can be attached or removed on the base when the free ends of the plurality of shafts are always positioned above the base. Note that the plurality of shafts may include shafts that are not coupled to the upper end of the bottom mold driving rod via the coupling member. The shafts that are not connected to the upper end of the bottom mold driving rod can be moved upward due to at least the upper end of the bottom mold driving rod to close the raised-bottom molds, and can receive pressure when the raised-bottom molds are closed. When the two shafts coupled by the coupling members are positioned on either side in the arrangement direction of the raised-bottom molds, a sufficient coupling space can be provided when using a rotary transfer blow molding apparatus. In this case, since the shafts that are not connected to the upper end of the bottom mold driving rod are disposed between the shafts coupled by the coupling members, flexure of the third securing plate can be prevented, so that the accuracy of the height of the plurality of raised-bottom molds can be improved. This improves the molding quality of the molded articles.

(4) In the blow mold unit, two second pressure-receiving plates among the plurality of second pressure-receiving plates that respectively surround the two shafts may be formed in a shape of a pair of split molds that are respectively secured on the first securing plate and the second securing plate, and may include a clearance section that prevent interference with the two shafts when the first blow cavity split mold and the second blow cavity split mold are closed, and two second pressure-receiving plates among the plurality of second pressure-receiving plates that respectively surround remaining shafts among the plurality of shafts other than the two shafts may be secured on one of the first securing plate and the second securing plate, and may be provided with a bush that surrounds a shaft among the remaining shafts.

The second pressure-receiving plates can thus receive the clamping force applied to the first blow cavity split mold and the second blow cavity split mold.

In one embodiment of the invention, a temperature control medium passage may be formed in the first securing plate, the second securing plate, and the third securing plate. In this case, the first blow cavity split mold and the second blow cavity split mold can be controlled in temperature (e.g., cooled) via the first securing plate and the second securing plate Likewise, the raised-bottom mold can be controlled in temperature (e.g., cooled) via the third securing plate. The second pressure-receiving plate can also be controlled in temperature (e.g., cooled) via the third securing plate. This makes it possible to prevent thermal expansion of the pressure-receiving plate, so that adhesion to the plurality of shafts can be maintained.

The blow mold unit according to one embodiment of the invention may further include a mounting section by which a temporary securing member is removably secured, the temporary securing member temporarily securing the first securing plate and the second securing plate when attaching or removing the blow mold unit to or from the blow molding apparatus.

According to the above configuration, the first securing plate and the second securing plate that have been removed from the mold closing/opening device can be positioned when attaching or removing the blow mold unit. Therefore, the members of the blow mold unit are integrally secured, so that handling is facilitated.

(5) In the blow mold unit, the blow mold may be formed by two rows of blow molds, each of the two rows of blow molds including the first blow cavity split mold and the second blow cavity split mold that are closed so that the parting surface of the first blow cavity split mold and the parting surface of the second blow cavity split mold come in contact with each other, and the plurality of raised-bottom molds, the first blow cavity split molds of the two rows of blow molds may be secured on the first securing plate in a back-to-back arrangement, and two of the second securing plates may be respectively provided corresponding to each of the second blow cavity split molds of the two rows of blow molds.

One embodiment of the invention may be particularly effective for a blow mold unit that includes two rows of blow molds that have a large volume and are heavy. It becomes unnecessary to provide a horizontal tie rod (see FIG. 10 of JP-B-8-13501) by securing the first blow cavity split molds of the two rows of blow molds on the first securing plate in a back-to-back arrangement. Therefore, the blow mold unit does not interfere with another member when the blow mold unit is slid on the base of the blow molding apparatus.

(6) The blow mold unit may further comprise:

a mounting section by which a temporary securing member is removably secured, the temporary securing member temporarily securing the two second securing plates and positioning the two second securing plates relative to the first securing plate when attaching or removing the blow mold unit to or from the blow molding apparatus.

According to the above configuration, the two second securing plates that have been removed from the mold closing/opening device can be positioned relative to the first securing plate when attaching or removing the blow mold unit. Therefore, the members of the blow mold unit are integrally secured, so that handling is facilitated.

(7) The blow mold unit may further comprise:

two securing blocks that are secured on the base, the two securing blocks may be respectively secured on two first pressure-receiving plates among the plurality of first pressure-receiving plates that are positioned on either side of the first blow cavity split molds secured on the first securing plate, and each of the two securing blocks may secure the two first pressure-receiving plates on the base.

It is unnecessary to move the first securing plate on which the two first blow cavity split molds are secured in a back-to-back arrangement when closing or opening the blow mold. Therefore, the first pressure-receiving plates secured on the first securing plate are secured on the base of the blow molding apparatus via the two securing blocks. This makes it possible to secure the blow mold unit on the blow molding apparatus.

(8) In the blow mold unit, each of the two securing blocks may include a roller that comes in rolling contact with the base, and a roller driving member that moves the roller downward from an upward position at which the roller does not come in rolling contact with the base to a downward position at which the roller comes in rolling contact with the base.

(9) The blow mold unit may further comprise:

two reinforcing plates, either end of each of the two reinforcing plates being secured on an outer wall of two mold closing/opening sections secured on the base, a middle part of each of the two reinforcing plates may secure the two first pressure-receiving plates on either side of the first blow cavity split molds on the two mold closing/opening sections at a position higher than the two securing blocks.

The two reinforcing plates prevent a situation in which the upper end of the two first blow cavity split molds that are secured by the two securing blocks at the lower end falls in the mold opening/closing direction. If only one of the two second blow cavity split molds is closed in advance relative to the first blow cavity split mold due to desynchronization caused by backlash or the like, the upper end of the first blow cavity split mold that is secured only at the lower end may fall.

In one embodiment of the invention, a plurality of stoppers may be formed on the upper side of the first securing plate, the plurality of stoppers restricting the lower limit position of transfer plates that transfer a plurality of neck molds that are clamped to the first blow cavity split mold and the second blow cavity split mold.

The plurality of stoppers can implement a function of a lower limit stopper for the transfer plates and a function that maintains the parallelism of the transfer plates. If the transfer plates are tilted or warped in the arrangement direction of the plurality of neck molds, the clamping (closing) height of the plurality of neck molds becomes non-uniform, so that the molding quality deteriorates.

(10) According to another embodiment of the invention, there is provided a blow mold unit that is secured on a base of a blow molding apparatus, the blow mold unit comprising:

two rows of blow molds that respectively include a first blow cavity split mold and a second blow cavity split mold, the first blow cavity split mold and the second blow cavity split mold being closed so that a parting surface of the first blow cavity split mold and a parting surface of the second blow cavity split mold come in contact with each other;

a first securing plate on which the first blow cavity split molds of the two rows of blow molds are secured in a back-to-back arrangement;

two second securing plates on which the second blow cavity split molds of the two rows of blow molds are respectively secured;

a plurality of first pressure-receiving plates, the plurality of first pressure-receiving plates being respectively disposed on either side of either of the first blow cavity split molds of the two rows of blow molds or either side of either of the second blow cavity split molds of the two rows of blow molds, and being respectively secured on the first securing plate or either of the two second securing plates; and two securing blocks that are secured on the base, the two securing blocks being respectively secured on two first pressure-receiving plates among the plurality of first pressure-receiving plates that are positioned on either side of the first blow cavity split molds secured on the first securing plate, and each of the two securing blocks securing the two first pressure-receiving plates on the base.

This embodiment of the invention defines applying the structure as defined in (7) to a blow mold unit that includes two rows of blow molds, and does not necessarily include a raised-bottom mold.

(11) The structure as defined in (8) may also be applied to this embodiment of the invention.

(12) The structure as defined in (9) may also be applied to this embodiment of the invention.

(13) Another embodiment of the invention defines a blow molding apparatus that includes a blow mold unit that has the above structure and includes one row of blow mold and a plurality of raised-bottom molds. The raised-bottom molds may be moved upward and downward when using one row of blow mold. In this case, it is possible to handle a pair of blow cavity split molds and a raised-bottom mold that are attached to or removed from different driver devices as an integral unit. This improves the blow mold unit attachment/removal workability.

(14) Another embodiment of the invention defines a blow molding apparatus that includes a blow mold unit that has the above structure and includes two rows of blow molds and a plurality of raised-bottom molds. It is indispensable to move the raised-bottom molds upward and downward when using two rows of blow molds that are configured so that two blow cavity split molds are secured in a back-to-back arrangement. In this case, it is possible to handle a pair of blow cavity split molds and a raised-bottom mold that are attached to or removed from different driver devices as an integral unit. This improves the blow mold unit attachment/removal workability.

(15) Another embodiment of the invention defines a blow molding apparatus that includes a blow mold unit that has the above structure, includes two rows of blow molds, and does not necessarily include a raised-bottom mold.

DESCRIPTION OF THE PREFERRED EMBODIMENT(S)

Preferred embodiments of the invention are described in detail below. Note that the following embodiments do not in any way limit the scope of the invention defined by the claims laid out herein. Note also that all elements of the following embodiments should not necessarily be taken as essential elements of the invention.

An example of a blow molding apparatus according to one embodiment of the invention that utilizes two rows of blow molds is described below. Note that the invention is not limited to a blow molding apparatus that employs a pitch change method described in connection with the following embodiments, but may also be applied to a blow molding apparatus that employs various pitch change methods such as that disclosed in JP-B-8-13501. Note also that the invention is not limited to a blow mold unit that includes two rows of blow molds, but may also be applied to a blow mold unit that includes one row of blow molds such as that disclosed in JP-A-6-270235. The following embodiments appropriately refer to an example of a structure that includes one row of blow molds.

1. Molding Process Performed by Blow Molding Apparatus, and Row Pitch

Figure 1:
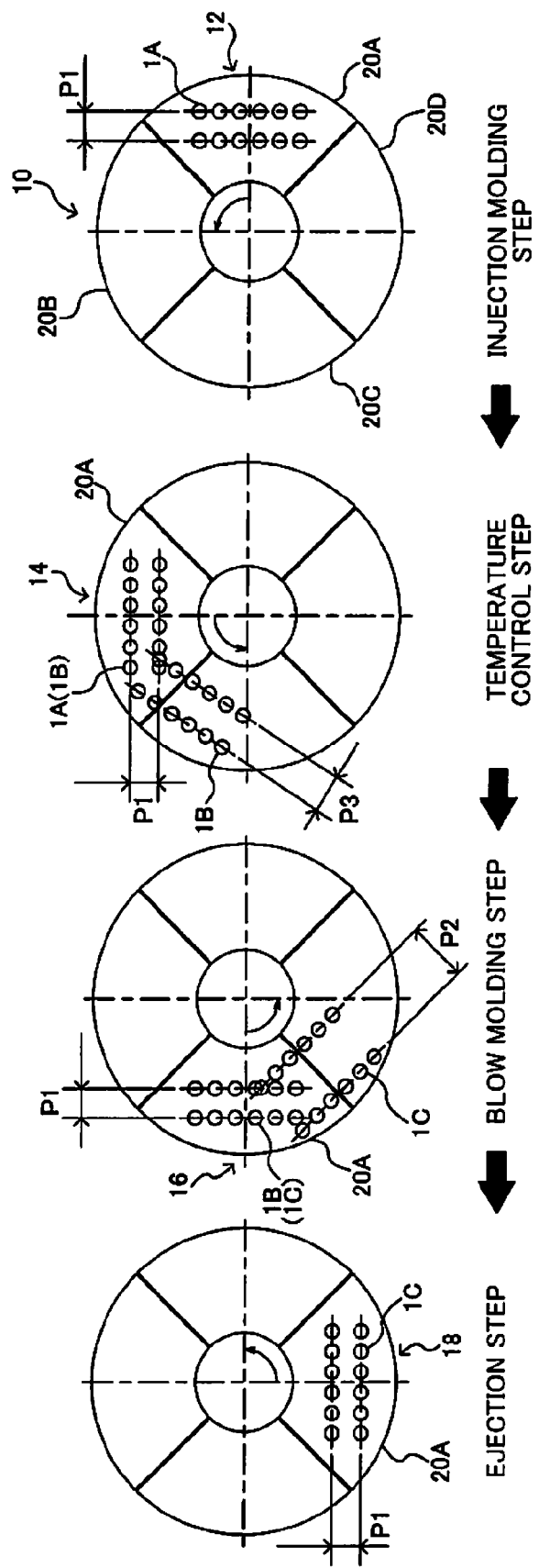
FIG. 1 is a schematic view illustrating four main steps performed by a rotary transfer blow molding apparatus according to one embodiment of the invention.

FIG. 1 is a schematic view illustrating four main steps performed by a rotary transfer blow molding apparatus according to one embodiment of the invention. The four main steps include an injection molding step, a temperature control step, a blow molding step, and an ejection step. A rotary transfer blow molding apparatus 10 illustrated in FIG. 1 includes an injection molding station 12, a temperature control station 14, a blow molding station 16, and an ejection station 18, the injection molding station 12, the temperature control station 14, the blow molding station 16, and the ejection station 18 being respectively provided in regions obtained by equally dividing a transfer region (360o) into four regions. The rotary transfer blow molding apparatus 10 also includes four transfer plates (i.e., transfer-support members) 20A to 20D that are intermittently transferred (rotated) to the injection molding station 12, the temperature control station 14, the blow molding station 16, and the ejection station 18. FIG. 1 illustrates a state in which the transfer plate 20A is intermittently transferred to the injection molding station 12, the temperature control station 14, the blow molding station 16, and the ejection station 18.

Each of the transfer plates 20A to 20D supports molded articles 1 (i.e., preforms 1A, preliminarily blow-molded preforms 1B, or containers 1C) via two rows of holding plates 30. The two rows of holding plates 30 (not illustrated in FIG. 1; see FIGS. 2 to 8) are provided so that the row pitch can be changed to P1, P2, or P3 (P1<P3<P2). For example, the row pitch P1 is 190 mm, the row pitch P2 is 290 mm, and the row pitch P3 is 210 mm.

Figure 2:
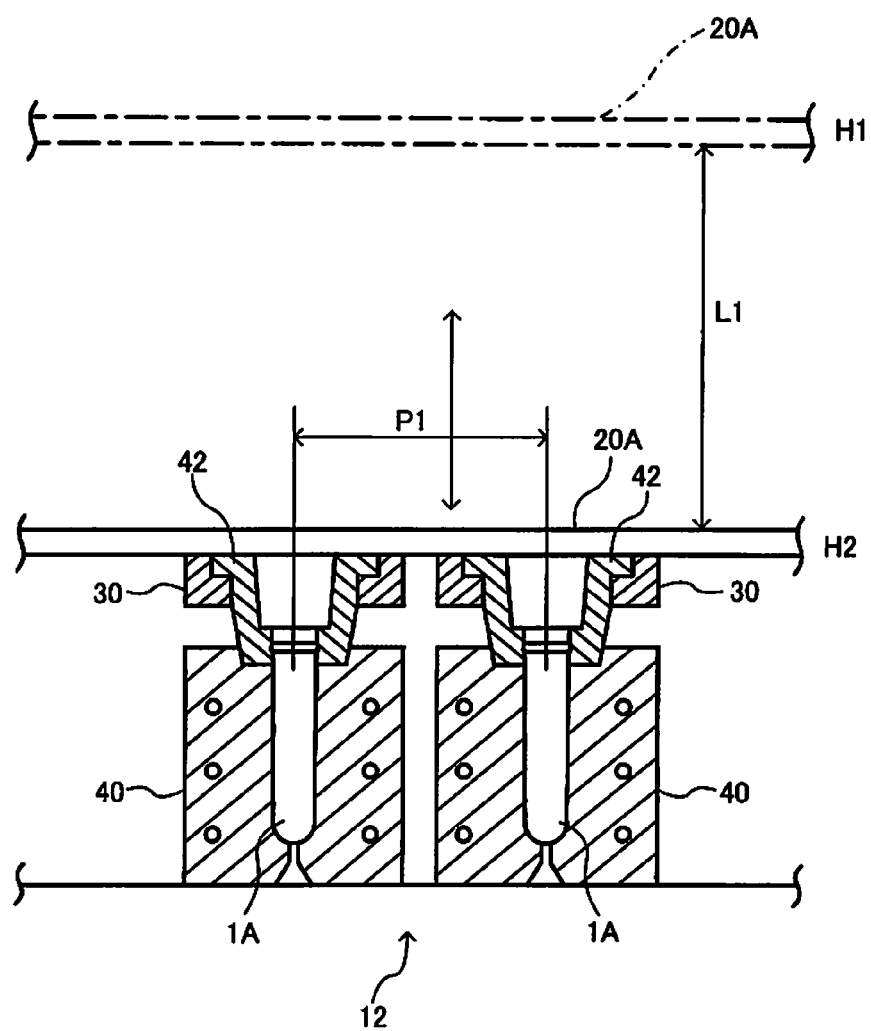
FIG. 2 is a view illustrating an injection molding step that injection-molds two rows of preforms disposed at a row pitch P1.
Figure 3:
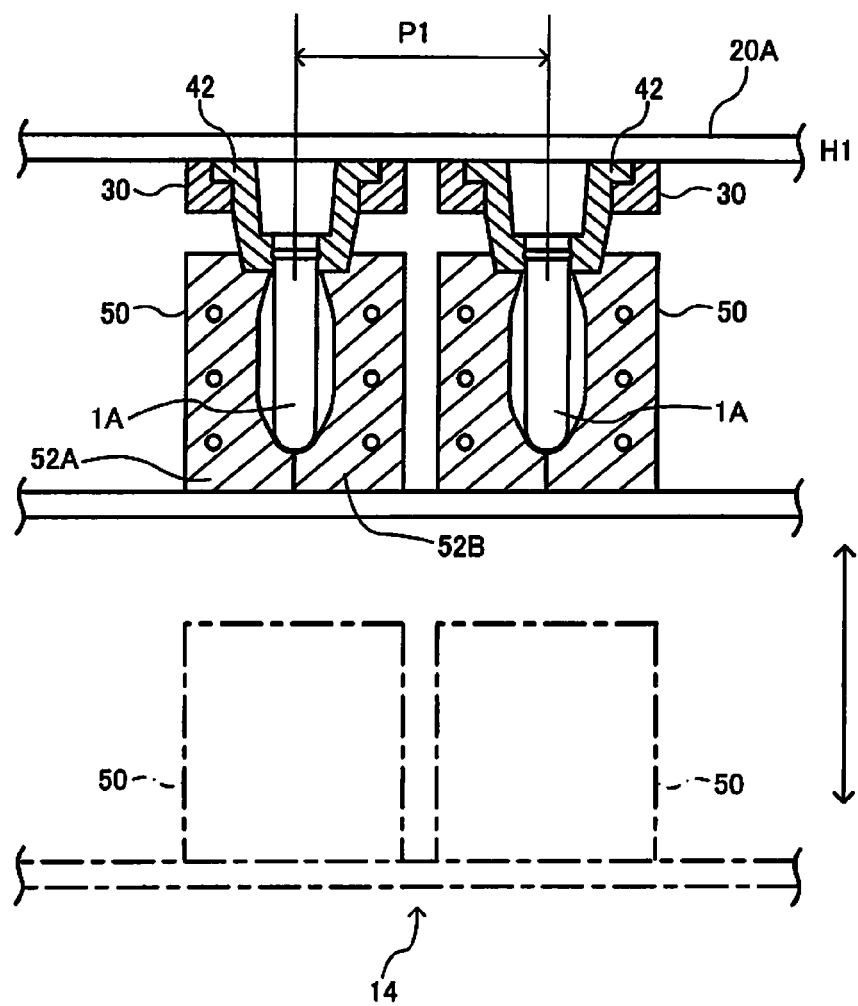
FIG. 3 is a view illustrating a temperature control step that preliminarily blow-molds two rows of preforms disposed at a row pitch P1.
Figure 4:
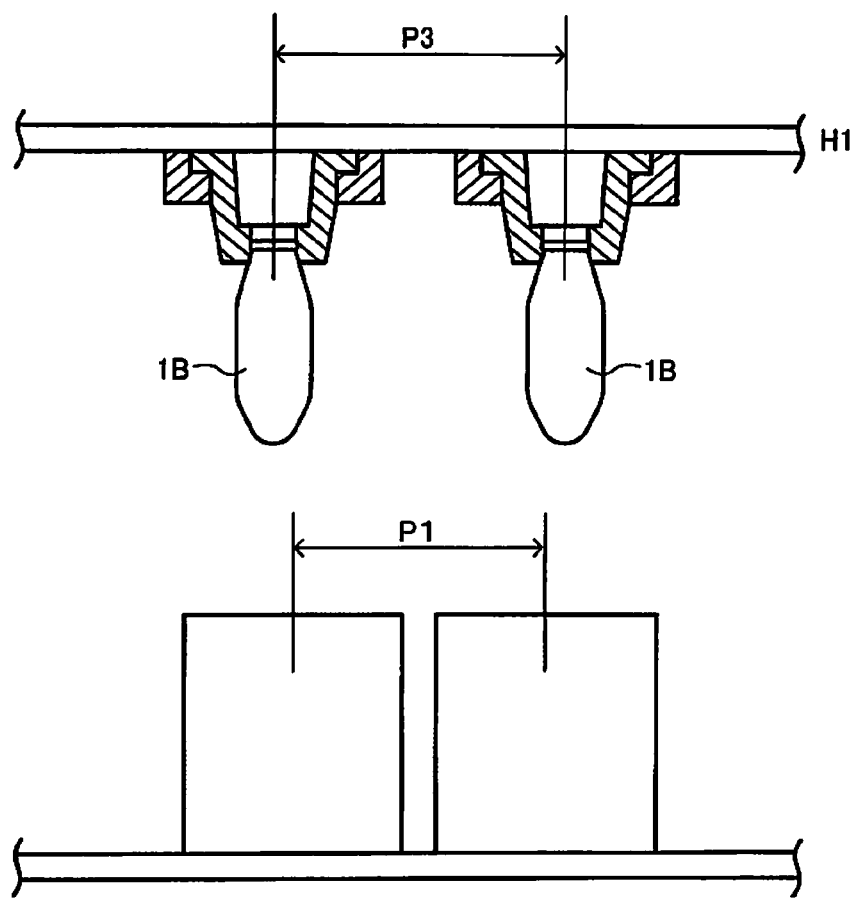
FIG. 4 is a view illustrating a process that changes the row pitch of two rows of preforms removed from temperature-controlled pot molds from P1 to P3.

FIGS. 2 to 8 illustrate the row pitch of the two rows of holding plates 30 employed in each step. Note that the two rows of holding plates 30 are supported by the transfer plate 20 (20A to 20D) so as to be slidable in the row direction (see FIG. 2 of JP-B-8-13501). One row of holding plate 30 is supported by the transfer plate 20 as illustrated in FIGS. 1 to 3 of JP-A-8-244103.

In the injection molding station 12 (see FIG. 2), a plurality of (twelve in FIG. 1) preforms 1A are injection-molded using two rows of injection cavity molds 40, neck molds 42 that are respectively held by the two rows of holding plates 30, and injection core molds (not illustrated in FIG. 2). The row pitch during injection molding is set to the minimum pitch P1. Note that the transfer plate 20A is moved downward to a height H2 during injection molding, and clamps the neck molds 42 held by the transfer plate 20A to the two rows of injection cavity molds 40, the height H2 being lower than a height H1 of the transfer plate 20A during transfer by a distance L. The transfer plate 20A is moved upward after the preforms 1A have been injection-molded, so that the preforms 1A held by the neck molds 42 are removed from the injection cavity molds 40. The injection core molds (not illustrated in FIG. 2) are also moved upward, and removed from the preforms 1A. The preforms 1A held by the neck molds 42 are then transferred to the temperature control station 14 by rotating the transfer plate 20A.

In the temperature control station 14 (see FIG. 3) that is disposed on the downstream side of the injection molding station 12 in the transfer direction, the body of the preforms 1A is caused to come in contact with the heated inner wall surface of two rows of temperature-controlled pot molds 50 so that the preforms 1A are heated to an optimum blow temperature. In one embodiment of the invention, the preforms 1A are preliminarily blow-molded in the two rows of temperature-controlled pot molds 50, and the preliminarily blow-molded preforms (1B) are caused to come in contact with the inner wall surface of the two rows of temperature-controlled pot molds 50. The body of the preliminarily blow-molded preforms 1B is thus increased in diameter (see FIG. 4), and heated to an optimum blow temperature. The row pitch of the two rows of holding plates 30 in the temperature control step is set to P1, for example. Specifically, the row pitch of the two rows of temperature-controlled pot molds 50 is also set to P1. Alternatively, the row pitch of the two rows of temperature-controlled pot molds 50 may be set to the intermediate pitch P3 (P1<P3<P2), and the row pitch of the two rows of holding plates 30 may also be set to the intermediate pitch P3 in the temperature control step. Note that the two rows of temperature-controlled pot molds 50 can be moved upward and downward. The two rows of temperature-controlled pot molds 50 are set at the upward position in the temperature control step. The temperature-controlled pot mold 50 used to preliminarily blow-mold the preform includes a pair of temperature-controlled pot split molds 52A and 52B that can be opened and closed. A temperature-controlled core may be used in the temperature control step. Note that the preforms need not necessarily be preliminarily blow-molded, as described later.

When transferring the preliminarily blow-molded preforms 1B, the row pitch of the two rows of holding plates 30 is set to the intermediate pitch P3 (P3<P1) (see FIG. 4) taking account of the blow molding step.

Figure 5:
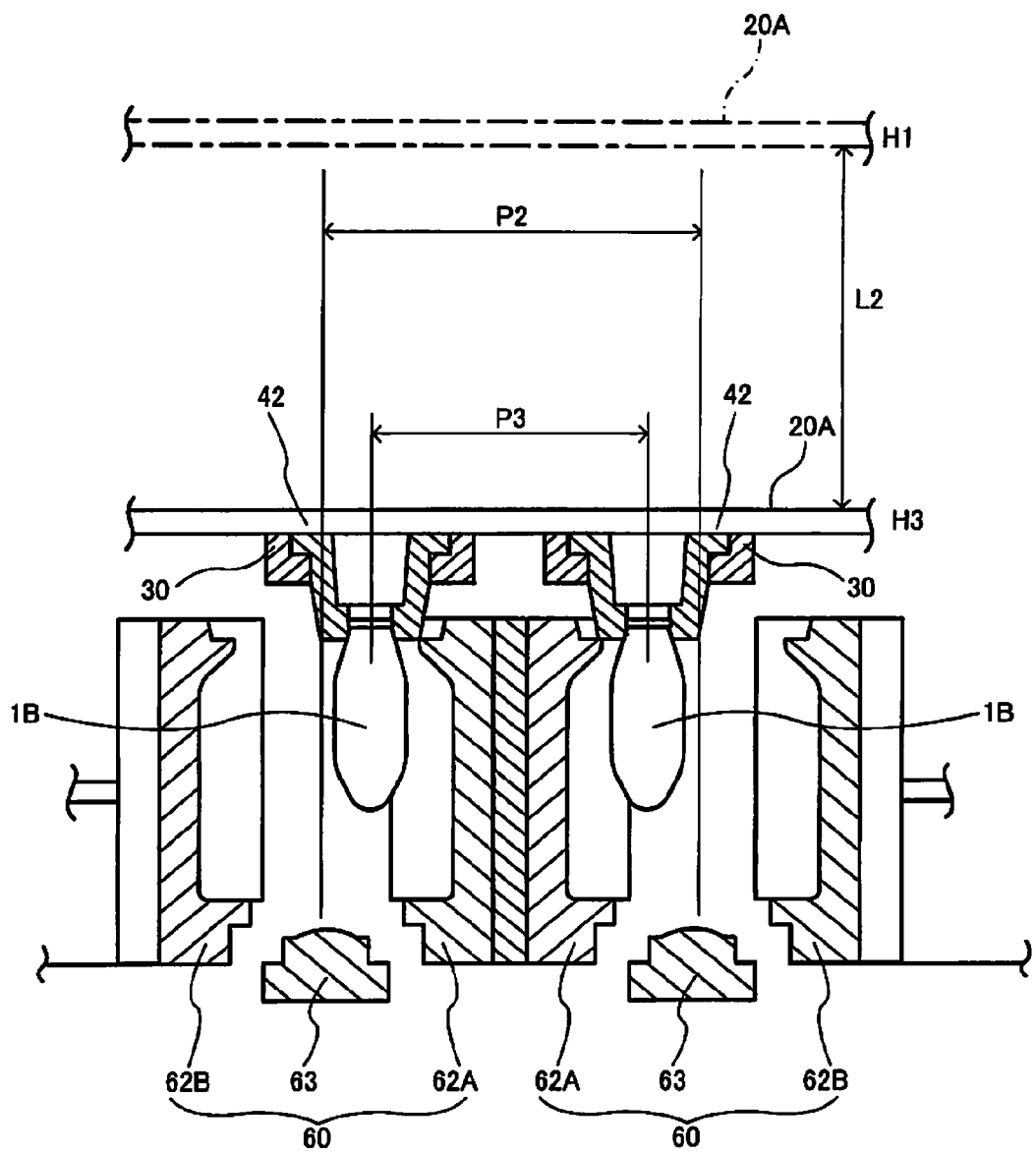
FIG. 5 is a view illustrating a process that transfers two rows of preforms disposed at a row pitch P3 to blow molds.
Figure 6:
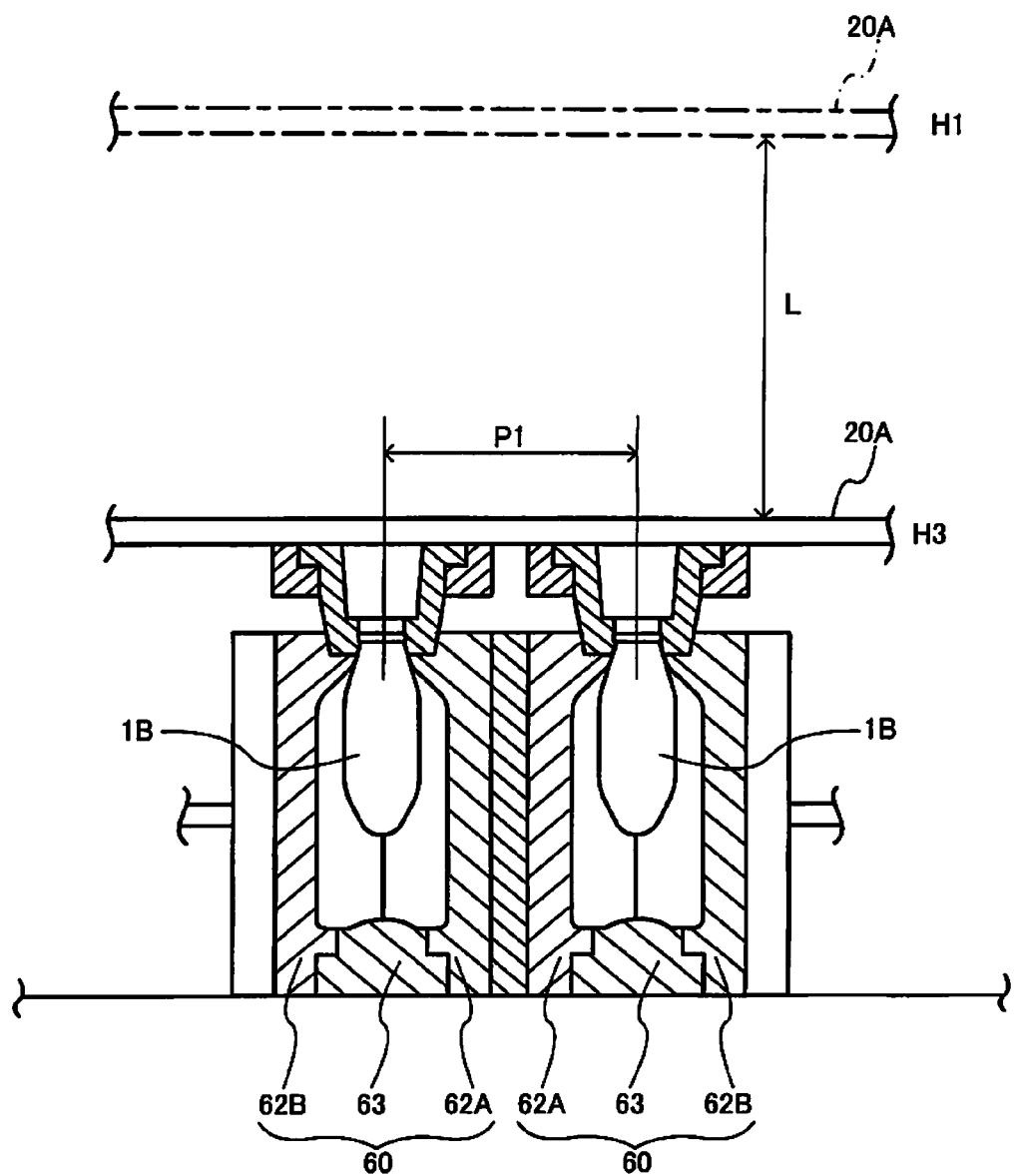
FIG. 6 is a view illustrating a process that closes blow molds (row pitch: P1).
Figure 7:
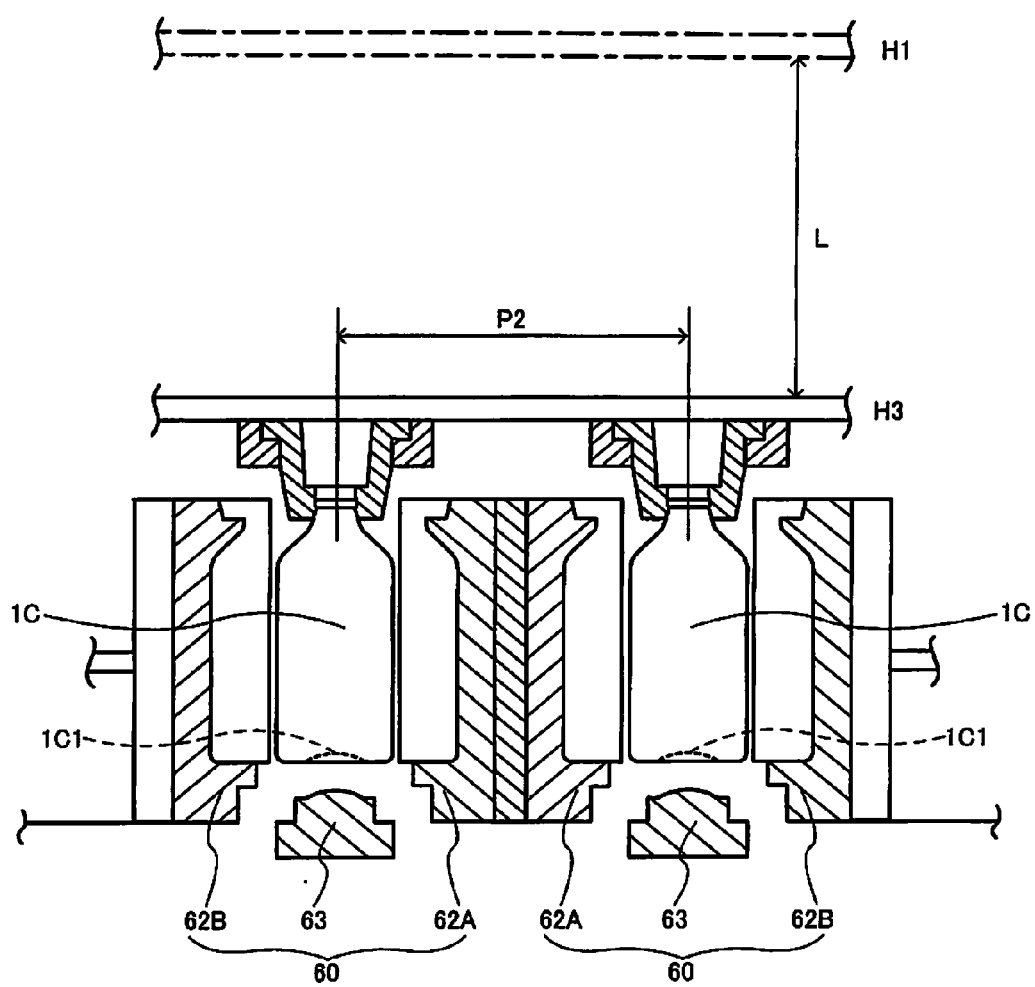
FIG. 7 is a view illustrating a process that opens blow molds (row pitch: P2).

As illustrated in FIGS. 5 to 7, the blow molding station 16 that is disposed on the downstream side of the temperature control station 14 in the transfer direction includes two rows of blow molds 60. In the blow molding station 16, the preliminarily blow-molded preforms 1B are blow-molded into containers 1C in the two rows of blow molds 60 that are closed (see FIG. 6). In the blow molding step, the transfer plate 20A is moved downward to a height H3 in the same manner as in the injection molding step.

Each of the two rows of blow molds 60 includes a pair of blow cavity split molds 62A and 62B, and a raised-bottom mold 63 (see FIG. 6). The containers 1C are provided with a raised bottom 1C1 (see FIG. 7) due to the two rows of raised-bottom molds 63. The blow cavity split molds 62A adjacent to each other in the row direction are secured in a back-to-back arrangement, and the blow cavity split molds 62B disposed on the outer side in the row direction are closed/opened. The row pitch of the two rows of blow molds is set to P2 when the blow cavity split molds 62B disposed on the outer side in the row direction have been opened (see FIGS. 5 and 7). Specifically, the blow cavity split molds 62A and 62B are disposed at unsymmetrical positions with respect to the blow molding centerlines (i.e., the vertical lines that indicate the pitch P3 in FIG. 5) when the blow cavity split mold 62B is opened (see FIG. 5). When one row of blow mold 60 is provided, the blow cavity split molds 62A and 62B are disposed at line-symmetrical positions with respect to the blow molding centerline when the blow mold is opened.

The row pitch of the two rows of holding plates 30 is set to P3 in a state in which the two rows of blow molds 60 are opened, and the preliminarily blow-molded preform 1B is transferred to the space between the pair of blow cavity split molds 62A and 62B of each of the two rows of blow molds 60. If the row pitch of the two rows of holding plates 30 is set to P1 (P1<P3), the preliminarily blow-molded preform 1B interferes with the blow cavity split mold 62A when the preform 1B is transferred to the space between the pair of blow cavity split molds 62A and 62B. If the row pitch of the two rows of holding plates 30 is set to the maximum pitch P2 (see JP-B-8-13501), interference with another member may occur, or space-saving may not be implemented due to an increase in the radius of rotation.

The row pitch of the two rows of holding plates 30 may be set to P3 before starting the temperature control step in order to prevent interference. In this case, the row pitch of the two rows of temperature-controlled pot molds 50 is set to P3. It suffices that the row pitch of the two rows of holding plates 30 be set to P3 in a state in which the preforms 1B are held by the two rows of holding plates 30 so that interference with the two rows of blow molds 60 can be prevented. In FIG. 5, the preliminarily blow-molded preforms 1B are transferred to the two rows of blow molds 60 that are set at the row pitch P2. Note that another configuration may also be employed (see FIGS. 16 and 17). The blow cavity split mold 62B may be closed in advance to a position at which the blow cavity split mold 62B does not interfere with the preliminarily blow-molded preform 1B. This makes it possible to implement the blow molding operation within one cycle.

The two rows of blow molds 60 are closed after the transfer operation illustrated in FIG. 5, and the row pitch of the two rows of blow molds 60 is set to P1 (see FIG. 6). The row pitch of the two rows of holding plates 30 is also set to P1. In this case, the row pitch change operation of the two rows of holding plates 30 may be performed in synchronization with the closing operation of the two rows of blow molds 60. Note that the row pitch of the two rows of raised-bottom molds 63 may be fixed at P1 (see FIG. 6). The blow molding step is implemented by introducing high-pressure air into the preliminarily blow-molded preforms 1B from a blow core mold while moving a stretching rod in the vertical direction.

The two rows of blow molds 60 are opened after the blow molding step. Specifically, the raised-bottom molds 63 are moved downward, and the blow cavity split molds 62B are opened, so that the row pitch of the two rows of blow molds 60 is set to P2 (see FIG. 7). The row pitch of the two rows of holding plates is also set to P2, and the containers 1C are removed (transferred) from the space between the pair of blow cavity split molds 62A and 62B of each of the two rows of blow molds 60. The row pitch change operation of the two rows of holding plates 30 may be performed in synchronization with the opening operation of the two rows of blow cavity split molds 62B. The raised-bottom molds 63 are opened in advance because they interfere with the raised bottom 1C1 of the containers 1C, and damage the containers 1C if the raised-bottom molds 63 are set at the blow molding position when the containers 1C held by the holding plates 30 are moved in the horizontal direction together with the blow cavity split molds 62B.

The transfer plate 20A is then moved upward, and rotated to transfer the two rows of containers 1C at a row pitch of P2.

Figure 8:
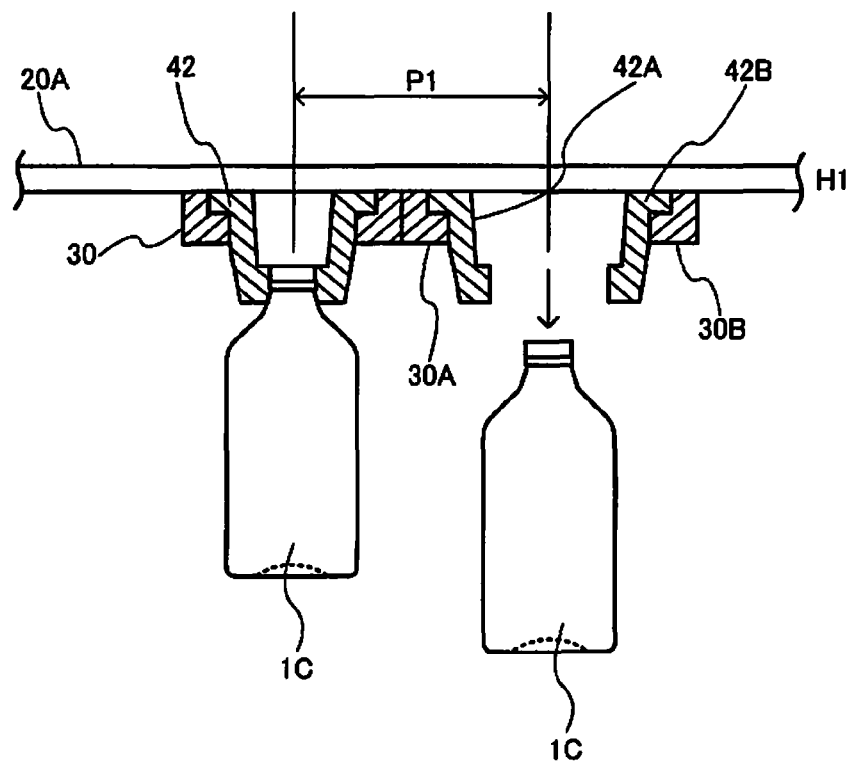
FIG. 8 is a view illustrating a sequential ejection step (row pitch: P1).

In the ejection station 18, the row pitch of the two rows of holding plates 30 is set to P1 (see FIG. 8). The holding plate 30 includes a pair of split plates 30A and 30B, and the neck mold 42 includes a pair of neck molds 42A and 42B that are respectively secured on the split plates 30A and 30B. Therefore, the containers 1C can be ejected by opening the pair of neck molds 42A and 42B by a known method (see FIG. 8). Although the row pitch P1 of the two rows of holding plates 30 is small, the opening/closing stroke of the two rows of holding plates 30 can be provided by driving the two rows of holding plates 30 one by one (see FIG. 8).

Figure 9:
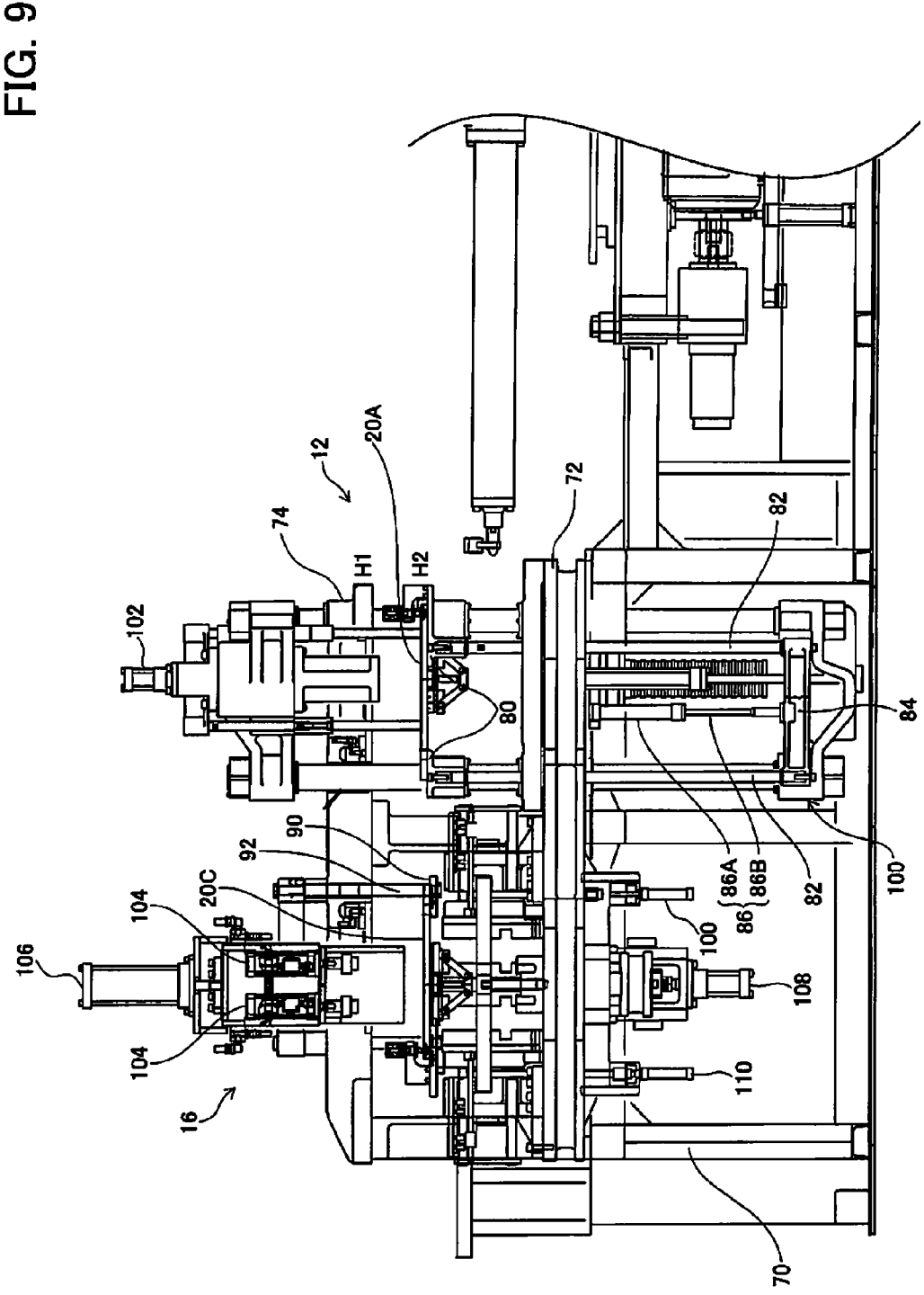
FIG. 9 is a front view illustrating a rotary transfer blow molding apparatus according to one embodiment of the invention.

2. Blow Molding Apparatus 2.1. Outline of Injection Molding Station and Blow Molding Station FIG. 9 is a front view illustrating the blow molding apparatus in which the molds are not provided. A lower base 72 is secured on a stage 70, and an upper base 74 is secured above the lower base 72. FIG. 9 illustrates the injection molding station 12 and the blow molding station 16. In the injection molding station 12 and the blow molding station 16 illustrated in FIG. 9, the transfer plates 20A and 20C have been moved downward to the height H2 or H3 (see FIGS. 2 and 5 to 7). In the injection molding station 12, the injection core molds 40 (see FIG. 2) are disposed on the lower base 72. In the blow molding station 16, the blow molds 60 (see FIGS. 5 to 7) are disposed on the lower base 72. The following description is given taking an example in which the transfer plate 20A is positioned in the injection molding station 12, the transfer plate 20B is positioned in the temperature control station 14, the transfer plate 20C is positioned in the blow molding station 16, and the transfer plate 20D is positioned in the ejection station 18.

A plurality of driving rods 82 that are used to move the transfer plate 20A upward and downward are provided in the injection molding station 12, the plurality of driving rods 82 extending downward from a receiving member 80 that holds the transfer plate 20A so that the transfer plate 20A can be rotated and moved upward and downward. The lower ends of the plurality of driving rods 82 are connected via a connection member 84. The transfer plate 20A is moved upward and downward by a transfer plate driver section 86 that includes a cylinder 86A that is secured on the lower base 72, and a rod 86B that is secured on the connection member 84.

A plurality of driving rods 92 that are used to move the transfer plate 20C upward and downward are provided in the blow molding station 16, the plurality of driving rods 92 extending upward from a receiving member 90 that holds the transfer plate 20C so that the transfer plate 20C can be rotated and moved upward and downward. A transfer plate driver section (not illustrated in FIG. 9) that moves the plurality of driving rods 92 upward and downward via a connection member is provided on the upper base 74.

A vertical mold-closing device 100, an injection core-removing section 102, and the like are also provided in the injection molding station 12. A stretching rod driver section 104, a blow core driver section 106, a raised-bottom mold driver section (driver device) 108, a blow pressure-receiving plate driver section 110, and the like are also provided in the blow molding station 16.

The following description focuses on the temperature control station 14, the blow molding station 16, and the ejection station 18 in which the row pitch is changed.

2.2. Temperature Control Station and Row Pitch Change Link Mechanism

Figure 10:
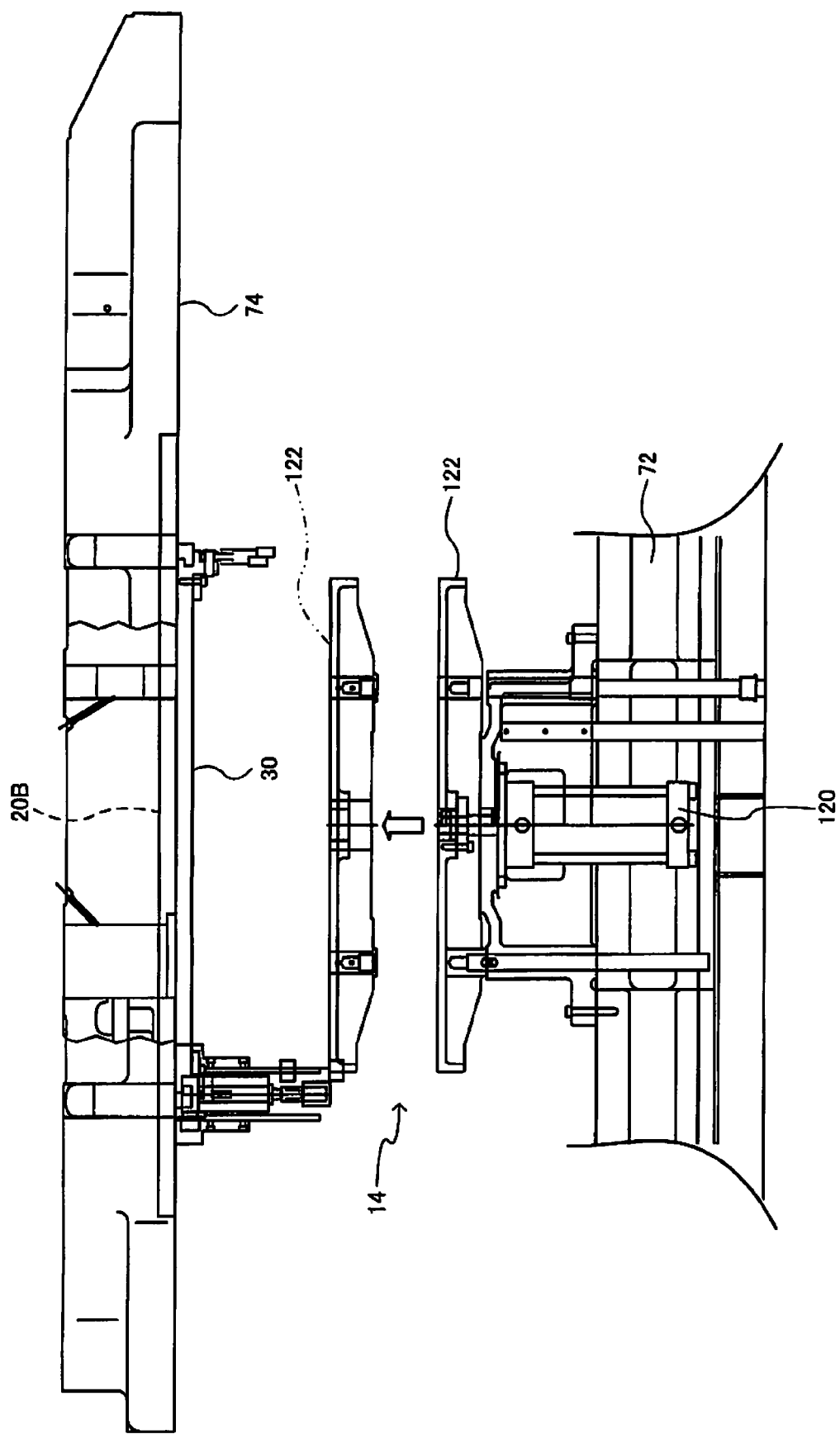
FIG. 10 is a view illustrating a temperature-controlled pot lift mechanism disposed in a temperature control station.

FIG. 10 illustrates the temperature control station 14 in a state in which the temperature-controlled pot molds 50 illustrated in FIG. 3 are not provided. A pot stage 122 that is moved upward and downward by a pot driver section 120 secured on the lower base 72 is disposed in the temperature control station 14. The temperature-controlled pot molds 50 illustrated in FIG. 3 can be moved upward and downward by the pot driver section 120.

Figure 11:
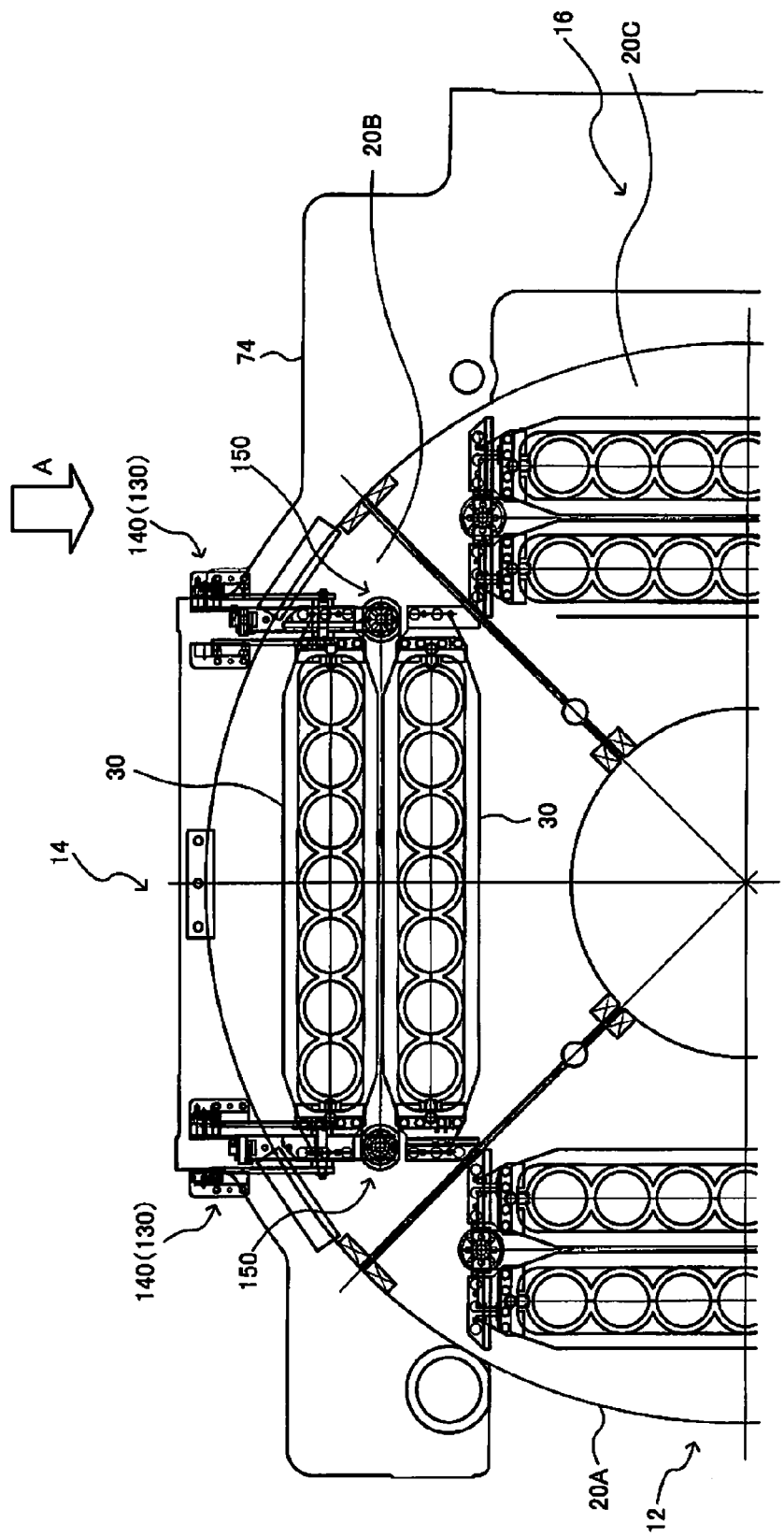
FIG. 11 is a bottom view illustrating a transfer plate.

FIG. 11 is a bottom view illustrating the transfer plates 20A to 20C. FIG. 11 illustrates a state in which the neck mold is not secured on the holding plate 30. A P1-P3 pitch change section 140 (i.e., row pitch change section 130) that changes the row pitch of the two rows of holding plates 30 provided on the transfer plate 20B that has stopped at the temperature control station 14 from P1 to P3 is provided on the upper base 74. The P1-P3 pitch change section 140 may be disposed on each end of the holding plate 30 in the longitudinal direction.

Figure 12:
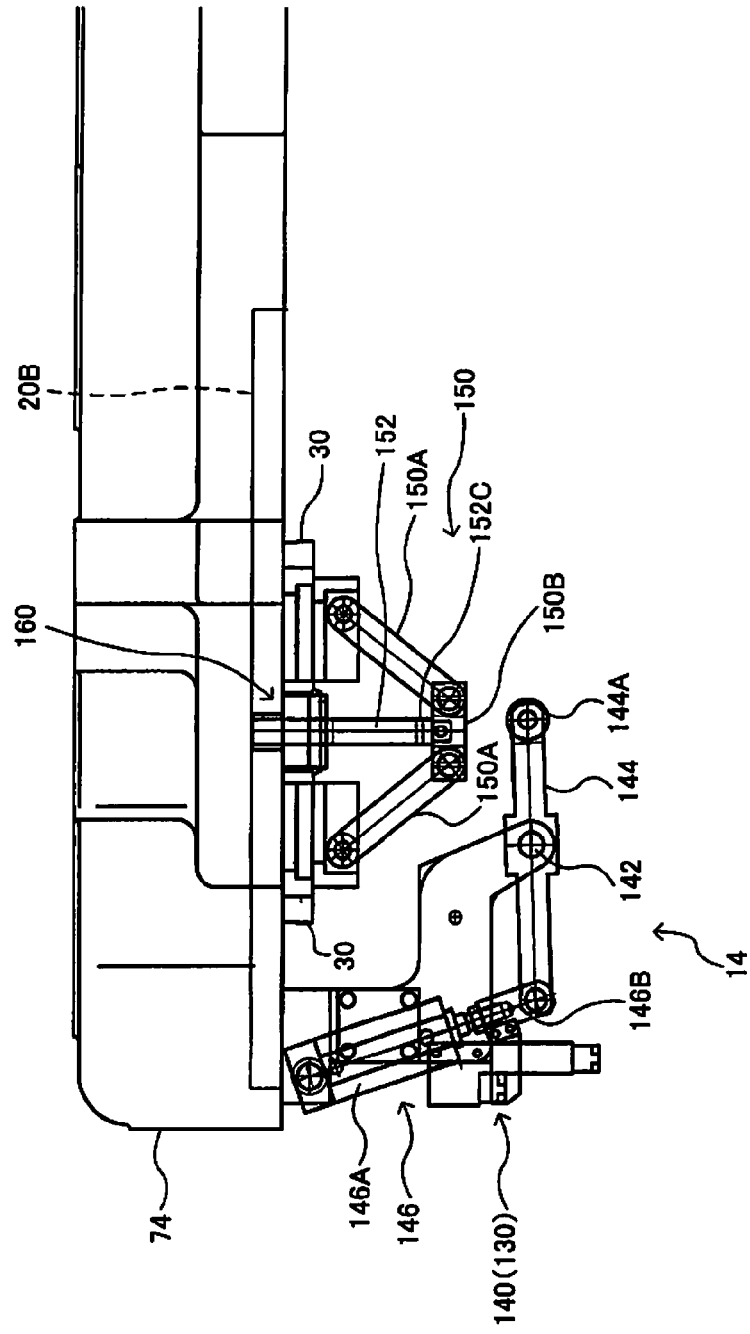
FIG. 12 is a view illustrating a row pitch change section disposed in a temperature control station.
Figure 13:
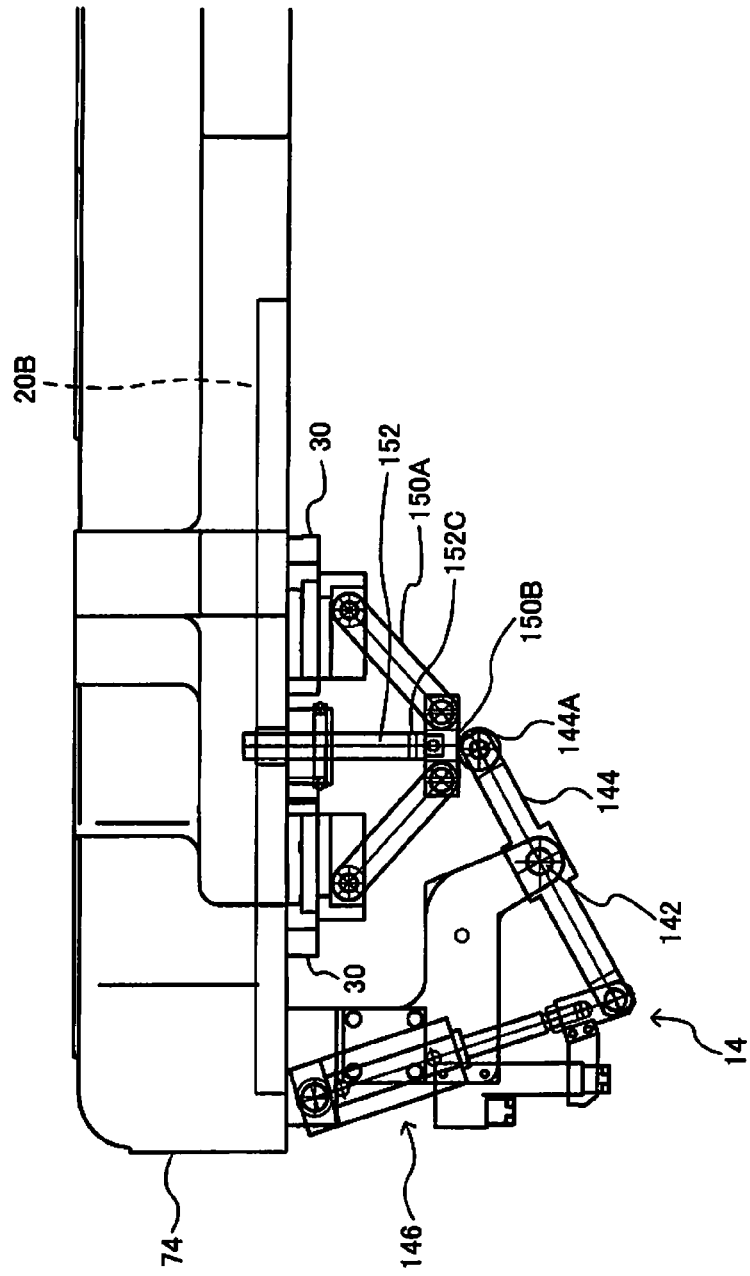
FIG. 13 is a view illustrating a pitch change operation of a row pitch change section disposed in a temperature control station.

As illustrated in FIGS. 12 and 13, the P1-P3 pitch change section includes a swing arm 144 that swings around a swing shaft 142 supported by the upper base 74, and an arm driver section 146 that swings the swing arm 144. The arm driver section 146 includes a cylinder 146A that is secured on the upper base 74, and a rod 146B that is connected to one end of the swing arm 144 using a pin or the like. When the rod 146B is extended by the cylinder 146A, the other end (that is provided with a roller 144A, for example) of the swing arm 144 is moved upward.

Figure 14:
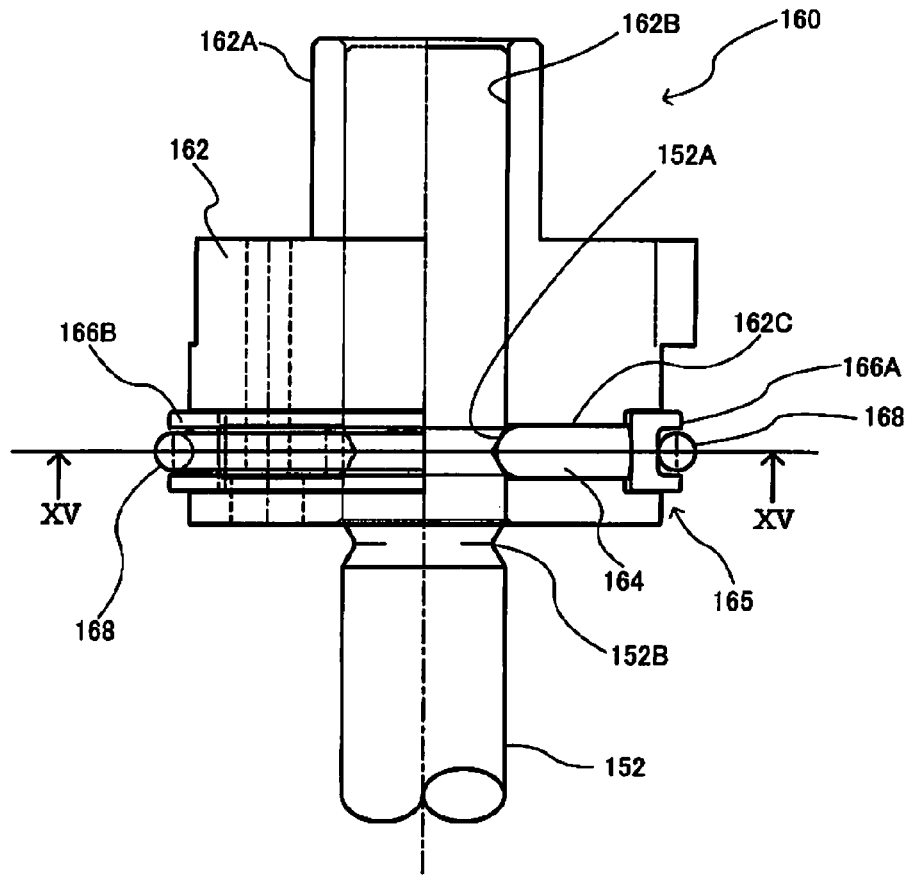
FIG. 14 is a view illustrating a row pitch-keeping member disposed on a transfer member.

The two rows of holding plates 30 secured on the transfer plate (20A to 20D) are provided with a row pitch change link mechanism 150 that displaces due to the driving force applied by the P1-P3 pitch change section 140 (i.e., row pitch change section 130), and changes the row pitch, the row pitch change link mechanism 150 being provided on each end of the two rows of holding plates 30 in the longitudinal direction. The row pitch change link mechanism 150 includes a pair of first arms 150A, one end of the pair of first arms 150A being rotatably supported by the two rows of holding plates 30, and a link arm 150B that rotatably links the other end of the pair of first arms 150A either eccentrically or coaxially. The row pitch change link mechanism 150 also includes a guide rod 152 that is moved (guided) when changing the row pitch, one end of the guide rod 152 being secured on the link arm 150B, and the other end of the guide rod 152 being supported by the transfer plate 20B. The guide rod 152 includes engagement sections 152A, 152B, and 152C that are spaced along the vertical direction (moving direction). The engagement section 152C is illustrated in FIGS. 12 and 13, and the engagement sections 152A and 152B are illustrated in FIG. 14. As illustrated in FIG. 14, the engagement sections 152A, 152B, and 152C are annular grooves formed in the surface of the guide rod 152.

When the P1-P3 pitch change section 140 swings the swing arm 144 from the state illustrated in FIG. 12 (row pitch: P1) to the state illustrated in FIG. 13 (row pitch: P3), the roller 144A provided on the end of the swing arm 144 causes the link arm 150B of the row pitch change link mechanism 150 to move upward. The angle formed by the pair of first arms 150A can thus be increased (see FIG. 13), so that the row pitch of the two rows of holding plates 30 can be increased. Since the pair of first arms 150A move line-symmetrically with respect to the guide rod 152 (centerline), the two rows of holding plates 30 also move line-symmetrically with respect to the centerline that perpendicularly intersects the row direction.

Figure 15:
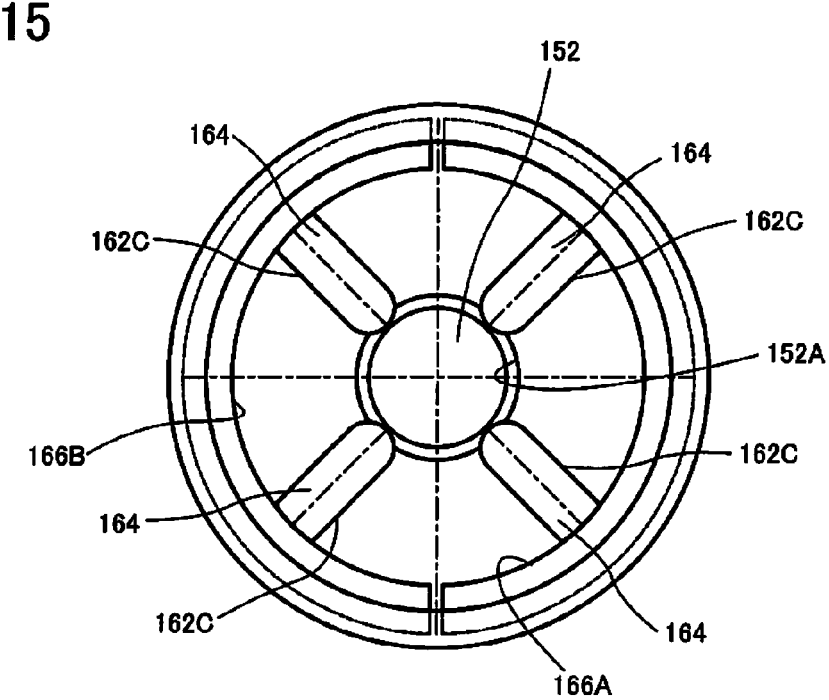
FIG. 15 is a cross-sectional view taken along the line XV-XV in FIG. 14.

The transfer plate 20B may include a row pitch-keeping member 160 that keeps the row pitch of the two rows of holding plates at P1, P2, or P3. As illustrated in FIG. 14, the row pitch-keeping member 160 includes a guide tubular body 162 that includes a fitting section 162A that is fitted into a hole formed in the transfer plate 20B. A through-hole 162B into which the guide rod 152 is inserted (in which the guide rod 152 is guided) is formed in the guide tubular body 162. As illustrated in FIG. 15, the through-hole 162B communicates with a plurality of (e.g., four) radial holes 162C. An engagement section 165 that elastically engages one of the engagement sections 152A, 152B, and 152C is supported within each radial hole 162C. The engagement section 165 includes a plunger 164 that is fitted into one of the engagement sections 152A, 152B, and 152C, a pair of split rings 166A and 166B that prevent removal of the plunger 164, and an elastic member (e.g., O-ring 168) that is provided along the pair of split rings 166A and 166B. The plunger 164 may include a spherical body and a shaft.

When the row pitch is P1 (see FIG. 12), the engagement section 165 elastically engages the engagement section 152A (see FIG. 14). Since the height of the guide rod 152 is fixed at this position, the row pitch of the holding plates 30 is kept at P1 by the row pitch change link mechanism 150. When the guide rod 152 has been displaced as illustrated in FIG. 13 after the temperature control step, the engagement section 165 elastically engages the engagement section 152B (i.e., the row pitch is changed to P2).

2.3. Blow Molding Station

The details of the blow molding station 16 are described below with reference to FIGS. 16 to 20. Note that an attachment/removal structure for the two rows of blow molds 60 including the raised-bottom molds 63 is described later.

Figure 16:
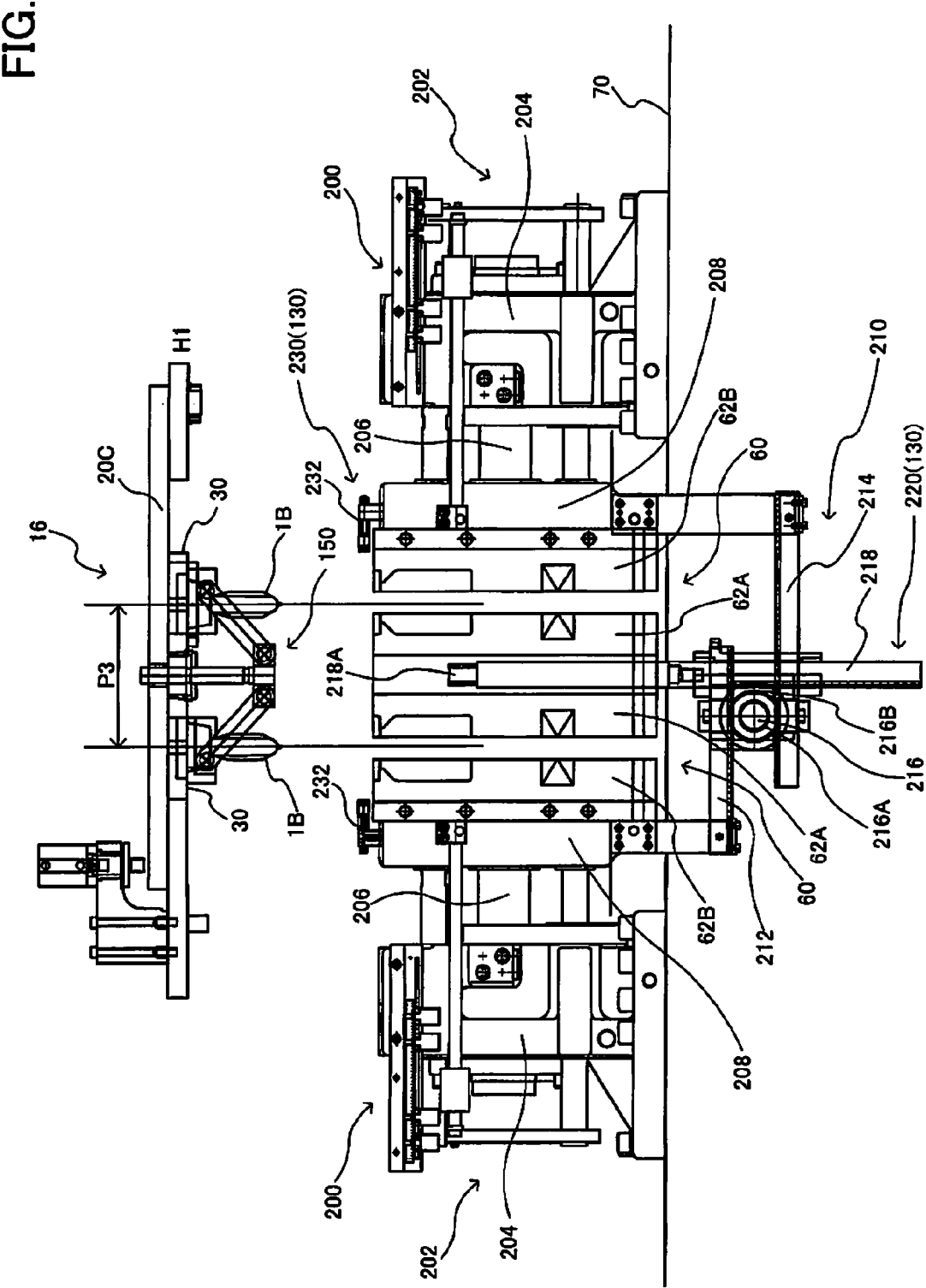
FIG. 16 is a view illustrating a state in which two rows of preforms disposed at a row pitch P3 have been transferred to a blow molding station.
Figure 17:
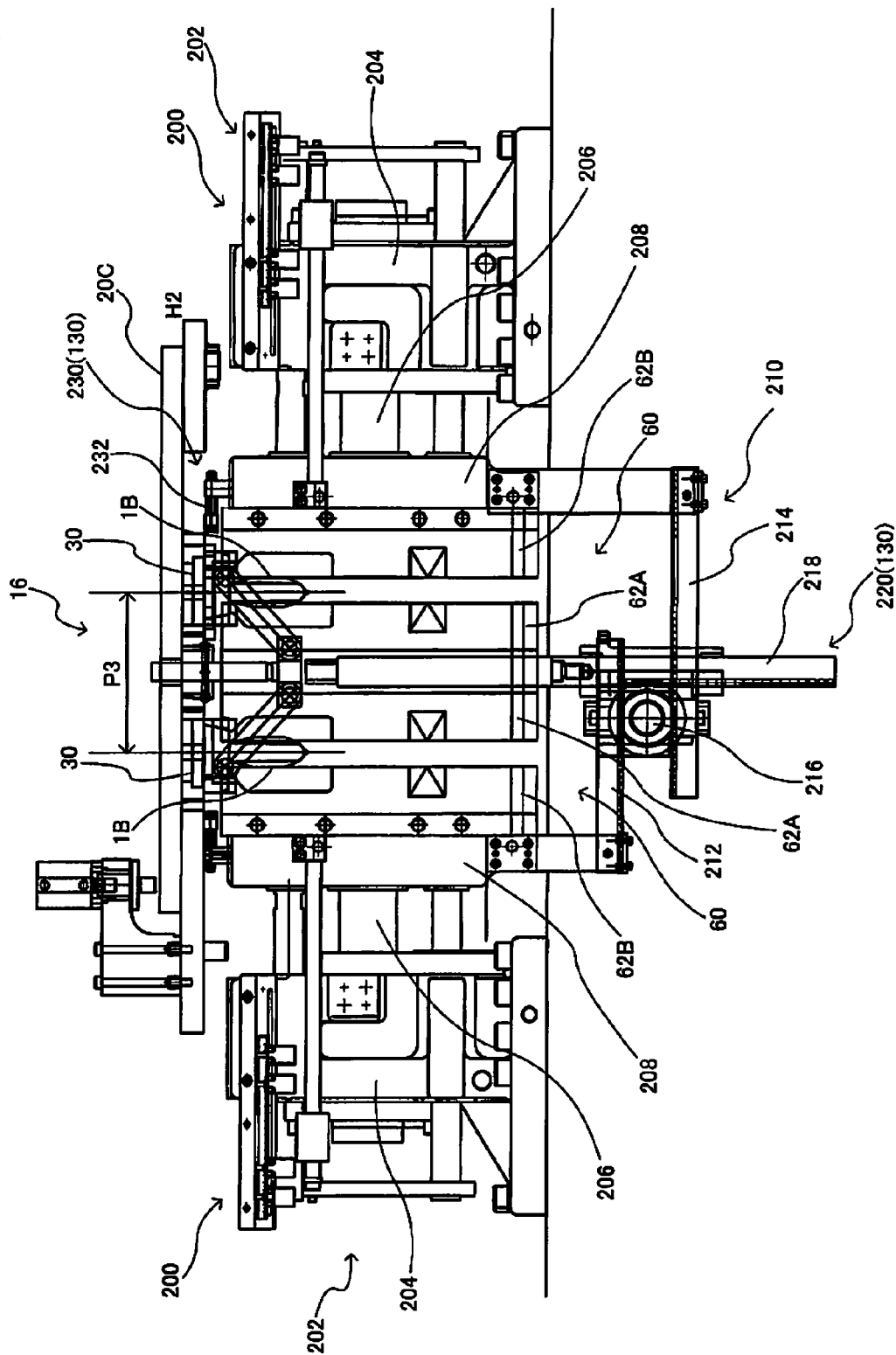
FIG. 17 is a view illustrating a state in which two rows of preforms disposed at a row pitch P3 have been transferred to two rows of blow molds that are opened.

FIG. 16 illustrates a state in which the two rows of holding plates 30 set to the row pitch P3 have been transferred to the blow molding station 16 together with the transfer plate 20C. FIG. 17 illustrates a state in which the transfer plate has been moved downward to the height H2 from the height H1 (see FIG. 16), and the preliminary blow-molded preforms 1B held by the two rows of holding plates 30 that are set to the row pitch P3 have been transferred to the two rows of blow molds 60 that are set to an open state. In FIGS. 16 and 17, the two rows of blow molds 60 have been closed so that the row pitch is larger than P3 to some extent instead of P2 (see FIG. 5). This makes it possible to reduce the mold closing time as compared with the case of closing the blow mold 60 from the row pitch P2 after the preliminary blow-molded preform 1B has been transferred to the blow mold 60.

Figure 18:
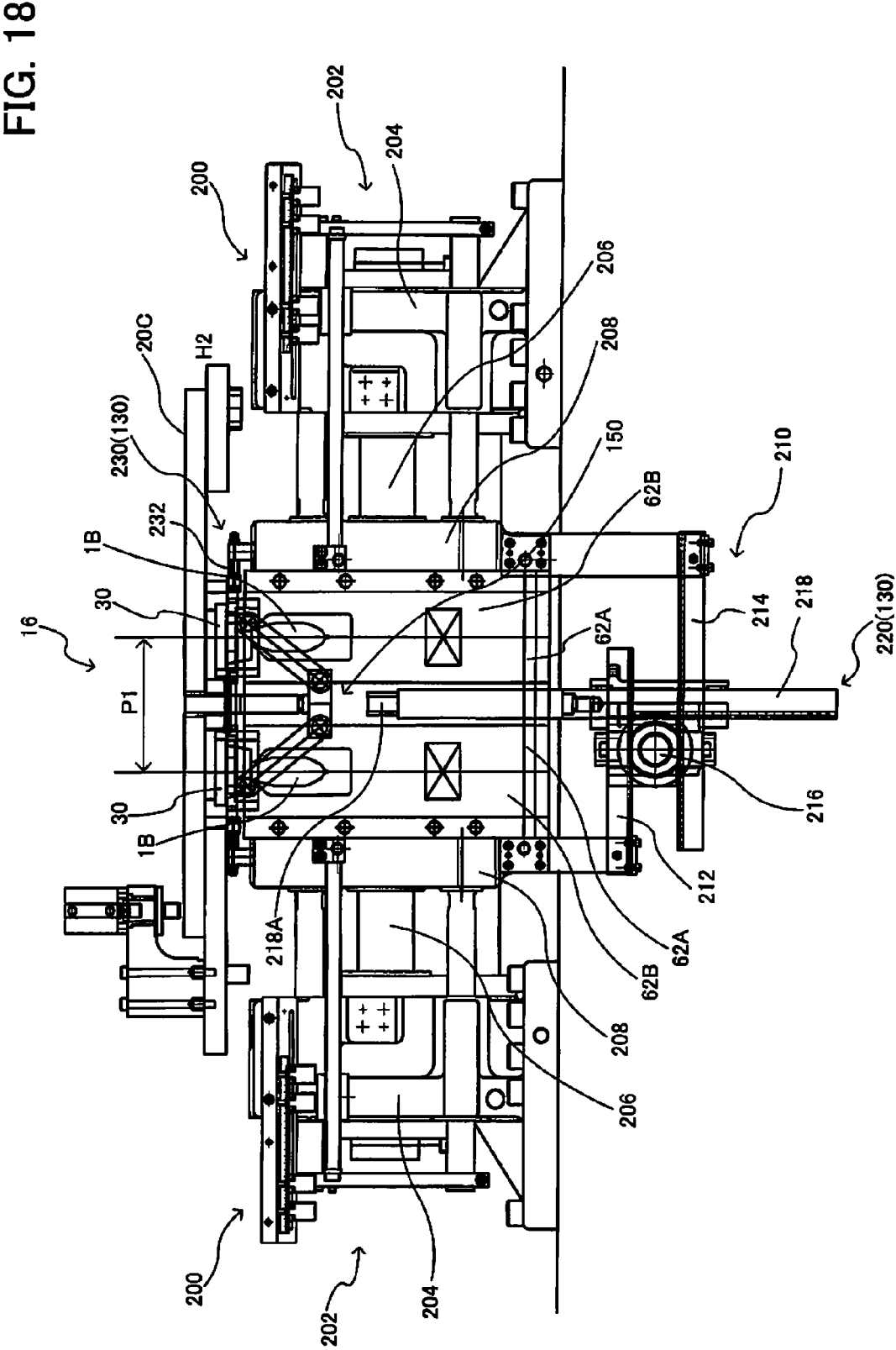
FIG. 18 is a view illustrating a state in which blow molds are closed (row pitch: P1).

The blow molding step is then performed by closing the two rows of blow molds 60 (see FIG. 18). A mold closing/opening device 200 that closes/opens the two rows of blow molds 60 is described below.

The mold closing/opening device 200 includes two mold closing/opening sections 202 that close or open the blow cavity split molds 62B of the two rows of blow molds 60 that are positioned on the outer side in the row direction. The mold closing/opening section 202 includes a hydraulic cylinder 204 and a rod 206, for example. Each rod 206 is connected to a mold closing plate 208 on which the blow cavity split mold 62B is secured. Since the two mold closing/opening sections 202 that respectively drive the two blow cavity split molds 62B are provided, the mold closing/opening device 200 can be formed without using a tie rod (bar).

Therefore, the blow mold 60 and the like can be transferred in the horizontal direction through the side of the blow molding apparatus when removing or maintaining the blow mold 60 and the like. When a horizontal tie rod is provided as illustrated in FIG. 10 of JP-B-8-13501, it takes time to transfer the blow mold 60 and the like due to the horizontal tie rod.

The mold closing/opening sections 202 are hydraulically controlled in synchronization, but may not move the blow cavity split molds 62B in mechanical synchronization. In order to deal with this problem, the mold closing/opening device 200 is provided with a split mold synchronization member 210 that moves the blow cavity split molds 62B in synchronization. The split mold synchronization member 210 includes racks 212 and 214 that are respectively connected to the blow cavity split molds 62B, and a pinion gear 216 that includes a gear 216A that engages the racks 212 and 214. This makes it possible to move the blow cavity split molds 62B in synchronization.

In the blow molding station 16, the row pitch change section 130 includes a P1-P2 pitch change section 220 that increases the row pitch of the two rows of holding plates 30 that hold the preliminarily blow-molded preforms 1B from P1 to P2 in synchronization with the opening motion of the two rows of blow molds 60. The P1-P2 pitch change section 220 engages the split mold synchronization member 210 that is displaced corresponding to the synchronization movement of the blow cavity split molds 62B, and changes the row pitch of the two rows of holding plates 30 from P1 to P2 in synchronization with the opening motion of the blow cavity split molds 62B.

The P1-P2 pitch change section 220 includes a gear 216B that is provided coaxially with the gear 216A of the pinion gear 216, and a rack 218 that engages the gear 216 and is moved upward and downward. A driving rod 218A that moves the guide rod 152 upward via the link arm 150B of the row pitch change link mechanism 150 provided to the two rows of holding plates 30 is secured on the rack 218.

The row pitch change section 130 also includes a P3-P1 pitch change section 230 that reduces the row pitch of the two rows of holding plates 30 that hold the preliminarily blow-molded preforms 1B from P3 to P1 in synchronization with the closing motion of the two rows of blow molds 60. The P3-P1 pitch change section 230 includes two pressing sections 232 that protrude toward each other above the mold closing plates 208. The pressing sections 232 press the two rows of holding plates 30 or an accessory thereof when the mold closing plates 208 move in the mold closing direction, and the row pitch of the two rows of holding plates 30 is set to P1 upon completion of the mold closing motion.

Figure 19:
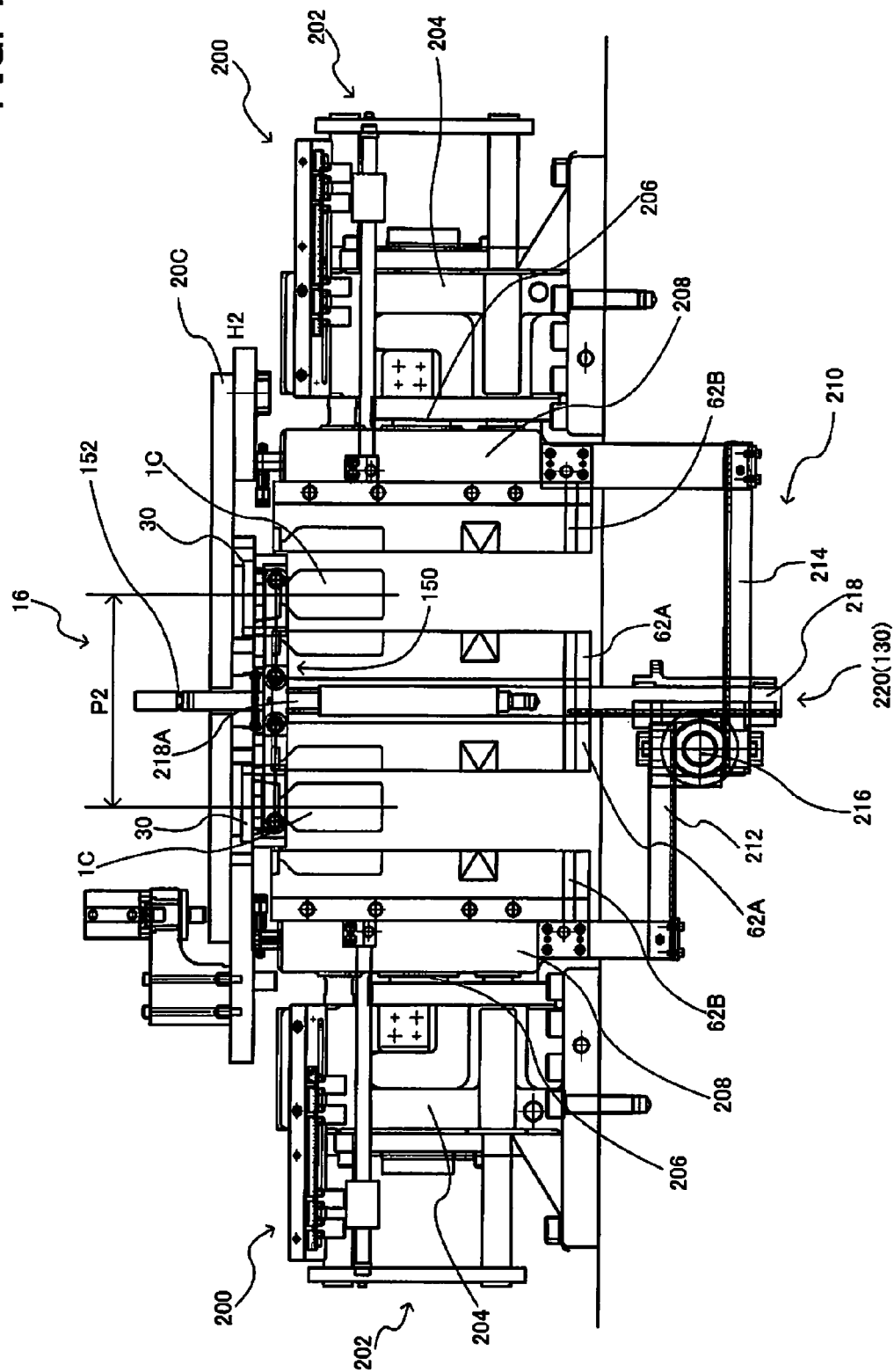
FIG. 19 is a view illustrating a state in which blow molds are opened (row pitch: P2).

The blow molding station 16 that includes the mold closing/opening device 200, the split mold synchronization member 210, the P1-P2 pitch change section 220, and the P3-P1 pitch change section 230 can implement the mold closing motion illustrated in FIG. 18 and the mold opening motion illustrated in FIG. 19. When implementing the mold closing motion illustrated in FIG. 18, the two rows of blow molds 60 are closed at the row pitch P1, and the row pitch of the two rows of holding plates 30 is also set to P1 by the P3-P1 pitch change section 230 and the row pitch change link mechanism 150. When implementing the mold opening motion illustrated in FIG. 19, the two rows of blow molds 60 are opened at the row pitch P2, and the link arm 150B is moved upward by the P1-P2 pitch change section 220 and the row pitch change link mechanism 150 via the driving rod 218A so that the row pitch of the two rows of holding plates 30 is also set to P2.

Figure 20:
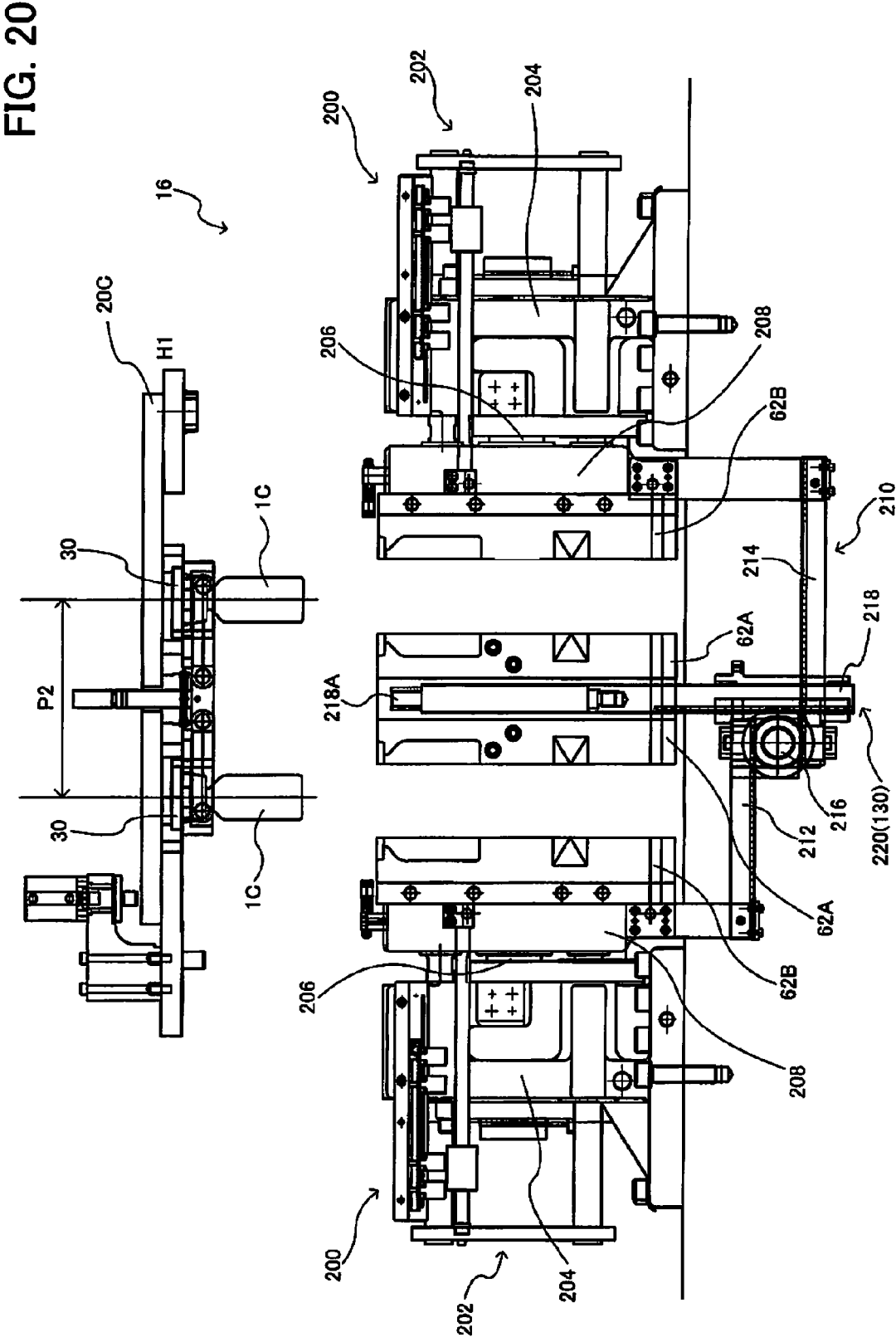
FIG. 20 is a view illustrating a transfer operation from a blow molding station (row pitch: P2).

FIG. 20 illustrates a state in which the transfer plate 20C has been returned to the height H1, and the containers 1C have been removed from the two rows of blow molds 60. The row pitch of the two rows of holding plates 30 is maintained at P2. The transfer plate 20C is then intermittently transferred to the ejection station 18.

2.4. Ejection Station

Figure 21:
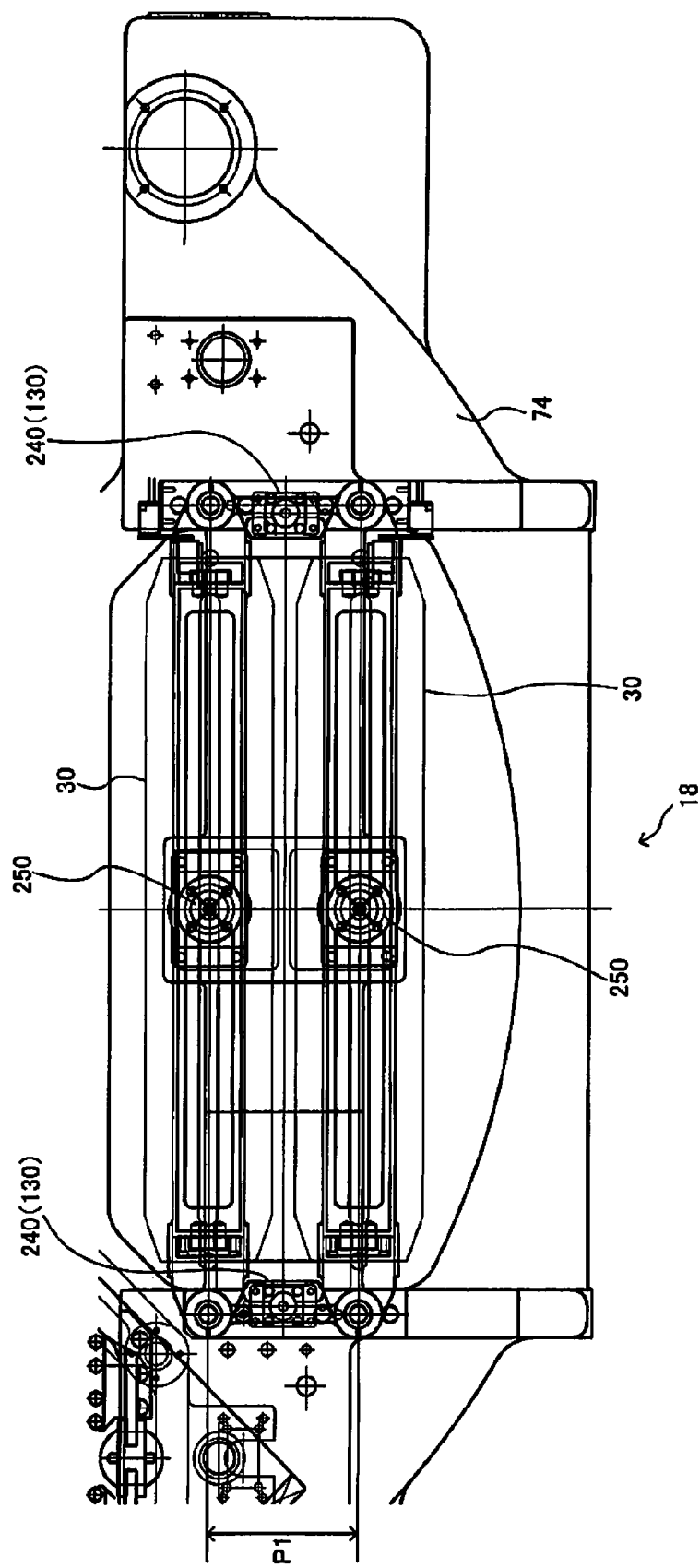
FIG. 21 is a plan view illustrating an ejection station.
Figure 22:
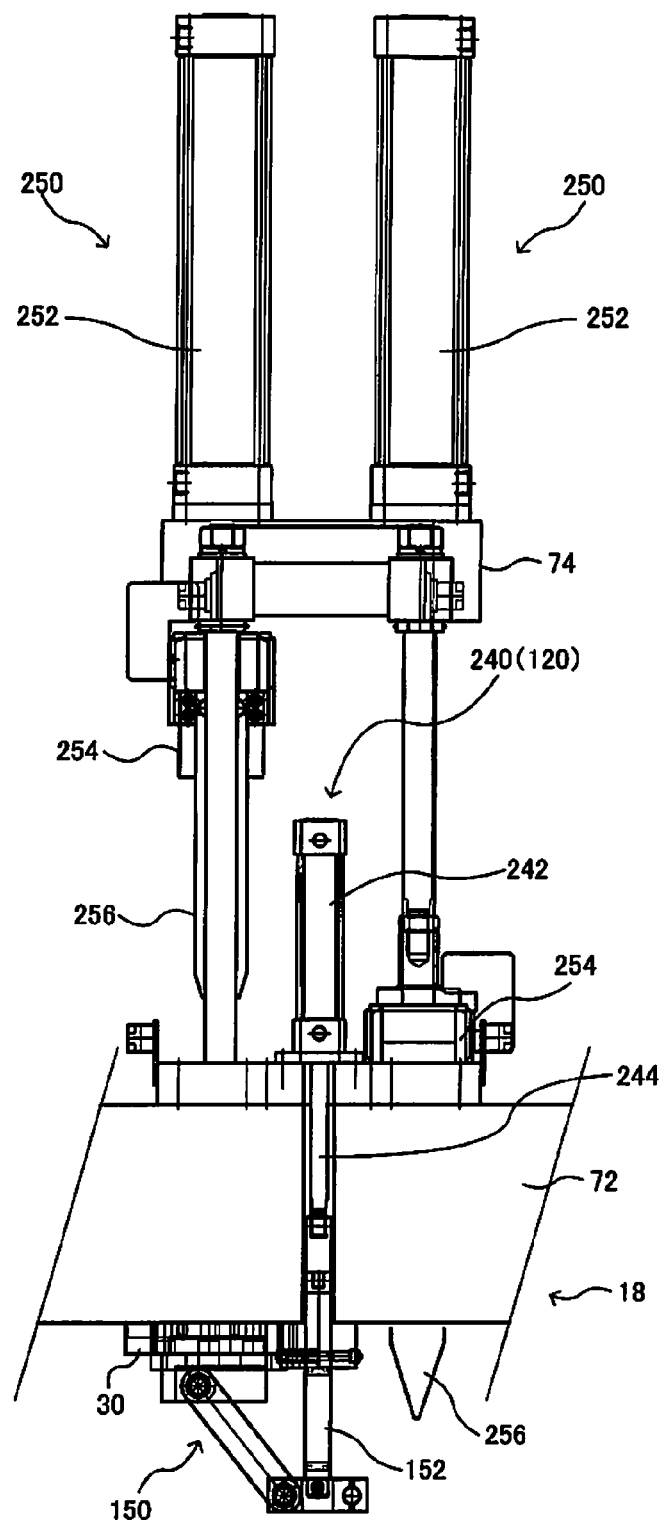
FIG. 22 is a side view illustrating an ejection station.

The row pitch change section 130 includes a P2-P1 pitch change section 240 that changes the row pitch of the two rows of holding plates 30 from P2 to P1 before the containers 1C are ejected from the two rows of holding plates 30 in the ejection station 18 illustrated in FIGS. 21 and 22. The P2-P1 pitch change section 240 is disposed on each end of the holding plate 30 in the longitudinal direction. The P2-P1 pitch change section 240 includes a cylinder 242 that is secured on the upper base 74, and a rod 244 that is inserted and removed by the cylinder 242. The rod 244 that has been driven presses the guide rod 152 of the row pitch change link mechanism 150, so that the row pitch of the two rows of holding plates 30 is changed from P2 to P1. FIGS. 21 and 22 illustrate a state after the row pitch of the two rows of holding plates 30 has been changed to P1.

The ejection station 18 further includes an ejection section 250 that ejects the containers 1C from the two rows of holding plates 30. Each of the two rows of holding plates 30 includes a pair of split plates, and each of the neck molds 42 includes a pair of neck split molds secured on the pair of split plates. The containers 1C are ejected by increasing the interval between the pair of split plates (see FIG. 3 of JP-B-8-13501, for example).

The ejection section 250 that is provided corresponding to each row includes a cylinder 252 that is secured on the upper base 74, a rod 254 that is inserted and removed by the cylinder 252, and a wedge-like member 256 that is secured on the lower end of the rod 254. The ejection station 18 ejects the containers 1C sequentially from the two rows of holding plates 30 that are disposed at the row pitch P1. FIG. 22 illustrates a state in which the containers 1C have been ejected from the holding plates 30 in the right row. As illustrated in FIG. 21, the interval between the two rows of holding plates 30 that are disposed at the row pitch P1 is narrow. If the containers 1C are simultaneously ejected from the two rows of holding plates 30 that are disposed at the row pitch P1, the holding plates 30 interfere with each other. Such interference can be prevented by increasing the pitch of the holding plates during ejection. However, since the subsequent step is the injection molding step (row pitch: P1), it is advantageous to eject the containers 1C in a state in which the two rows of holding plates 30 are disposed at the row pitch P1 in order to omit an unnecessary change in row pitch and implement space-saving. The row pitch of the two rows of holding plates 30 can be maintained at P1 during ejection by ejecting the containers 1C sequentially from the two rows of holding plates 30.

3. Blow Mold Unit
3.1. Structure of Blow Mold Unit

Figure 23:
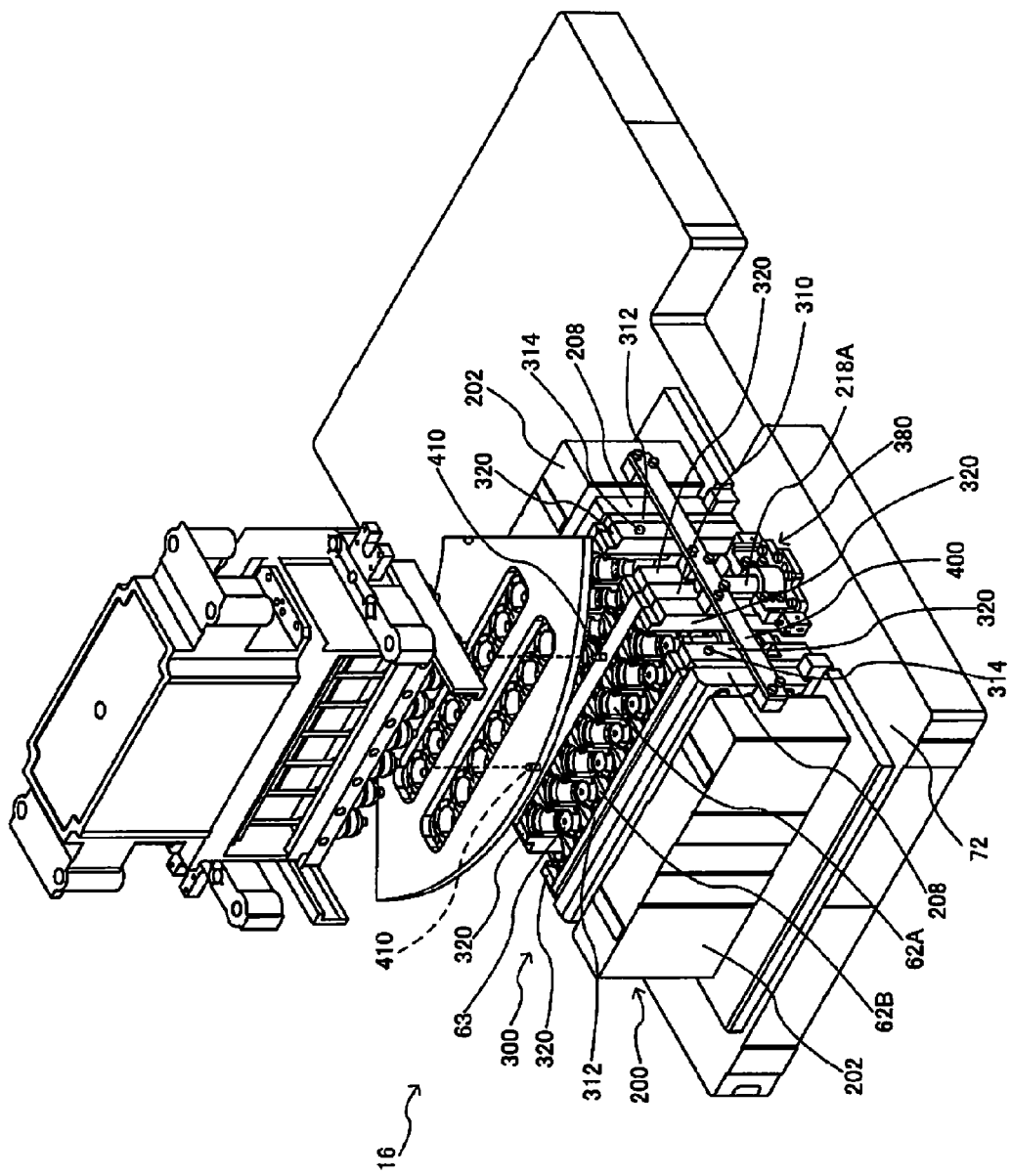
FIG. 23 is a schematic oblique view illustrating a blow molding station that includes a blow mold unit.

FIG. 23 is a schematic oblique view illustrating the blow molding station 16 that includes a blow mold unit 300. As illustrated in FIG. 23, the blow mold unit 300 that is secured on the lower base 72 of the blow molding apparatus 10 includes the blow mold 60 that includes a first blow cavity split mold 62A and a second blow cavity split mold 62B that are closed so that the parting surface of the first blow cavity split mold 62A and the parting surface of the second blow cavity split mold 62B come in contact with each other, and a plurality of raised-bottom molds 63 that respectively define a raised-bottom shape in a plurality of cavities defined by the first blow cavity split mold 62A and the second blow cavity split mold 62B.

The blow mold unit 300 also includes a first securing plate 310 on which the first blow cavity split mold 62A is secured, and a second securing plate 312 on which the second blow cavity split mold 62B is secured. When the blow mold unit 300 includes two rows of blow molds 60, the first blow cavity split molds 62A of the two rows of blow molds 60 are secured on the first securing plate 310 in a back-to-back arrangement. In the blow mold unit 300 that includes the two rows of blow molds 60, two second securing plates 312 are respectively connected to the two mold closing plates 208 of the mold closing/opening device 200. When the blow mold unit 300 includes only one row of blow mold 60, the first securing plate 310 and the second securing plate 312 are respectively connected to the two mold closing plates 208 of the mold closing/opening device 200 (see FIG. 5 of JP-A-8-244103, for example).

The blow mold unit 300 also includes first pressure-receiving plates 320 that are respectively disposed on either side of the first blow cavity split mold 62A or either side of the second blow cavity split mold 62B, and are respectively secured on the first securing plate 310 or the second securing plate 312. Four first pressure-receiving plates 320 are provided to one row of blow mold 60, and eight first pressure-receiving plates 320 are provided to two rows of blow molds 60. Each pair of first pressure-receiving plates 320 disposed opposite to each other receives the clamping force applied to the first blow cavity split mold 62A and the second blow cavity split mold 62B.

The blow mold unit 300 also includes a mechanism that supports the plurality of raised-bottom molds 63. The mechanism that supports the plurality of raised-bottom molds 63 is described below with reference to FIGS. 24 and 25. The blow mold unit 300 includes a third securing plate 330 that is disposed between the first securing plate 310 and the second securing plate 312 (see FIG. 25), the plurality of raised-bottom molds 63 being secured on a first side 330A of the third securing plate 330 (see FIG. 24). A plurality of (e.g., four) shafts 340 (342, 344) are suspended from a second side 330B of the third securing plate 330 opposite to the first side 330A, the lower end of each of the plurality of shafts 340 being a free end. The blow mold unit 300 also includes a plurality of second pressure-receiving plates 350 (352, 354) that are secured on the first securing plate 310 and the second securing plate 312 at a position below the third securing plate.

The third securing plate 330 that supports the plurality of raised-bottom molds 63 is thus disposed between the first securing plate 310 and the second securing plate 312 on which the first blow cavity split mold 62A, the second blow cavity split mold 62B, the first pressure-receiving plate 320, and the second pressure-receiving plate 350 are secured, and comes in contact with the second pressure-receiving plates 350 that are secured on the first securing plate 310 and the second securing plate 312 at a position below the third securing plate 330, so that the third securing plate 330 can be positioned when attaching or removing the blow mold unit 300.

The first blow cavity split mold 62A, the second blow cavity split mold 62B, and the raised-bottom molds 63 are thus integrated as a unit. The shafts 340 that are suspended from the third securing plate 330 and serve as a driving shaft that moves the raised-bottom molds 63 upward and downward are separated from the raised-bottom mold driver device 108 of the blow molding apparatus 10 when attaching or removing the blow mold unit 300. The first securing plate 310 and the second securing plate 312 are also separated from the mold closing plate 208 of the mold closing/opening device 200 when attaching or removing the blow mold unit 300. Therefore, the blow mold unit 300 can be integrally attached to or removed from the blow molding apparatus 10.

Note that the blow mold unit 300 can be attached or removed in a direction indicated by an arrow A illustrated in FIG. 11 (plan view), for example. When the blow mold unit 300 includes two rows of blow molds 60 that have a large volume and are heavy, it becomes unnecessary to provide a horizontal tie rod by securing the first blow cavity split molds 62A of the two rows of blow molds 60 on the first securing plate 310 in a back-to-back arrangement. Therefore, the blow mold unit 300 does not interfere with another member when the blow mold unit 300 is attached or removed in the direction indicated by the arrow A illustrated in FIG. 11 (plan view).

Figure 24:
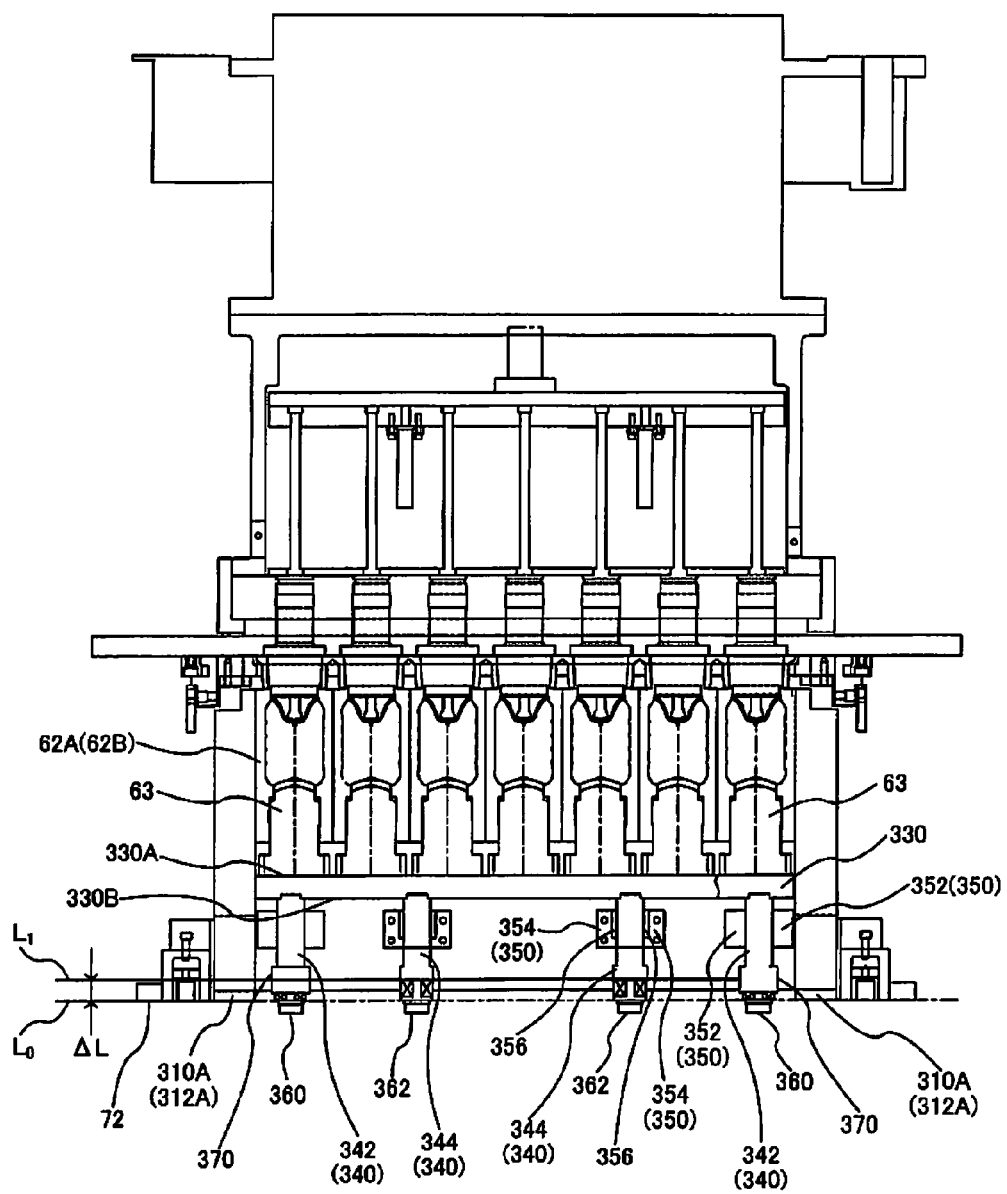
FIG. 24 is a front cross-sectional view illustrating a blow mold unit.
Figure 26:
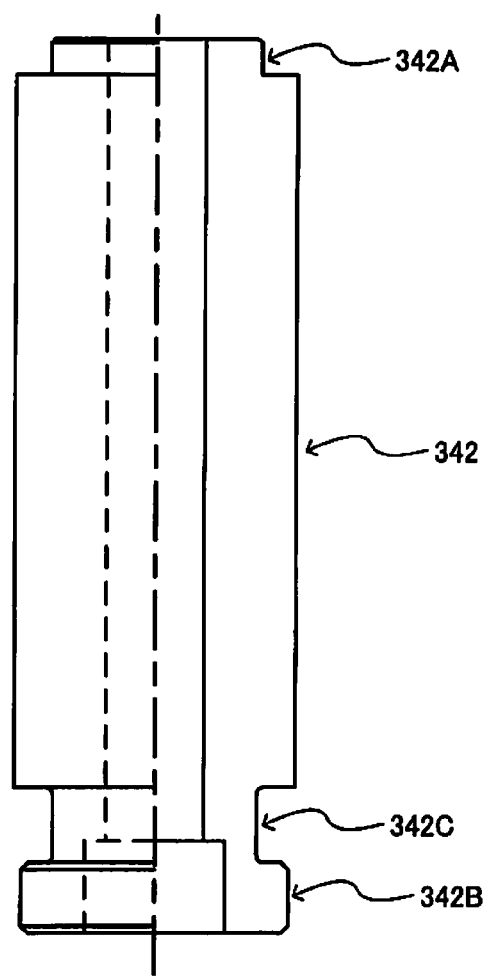
FIG. 26 is a front view illustrating a first shaft.
Figure 27:
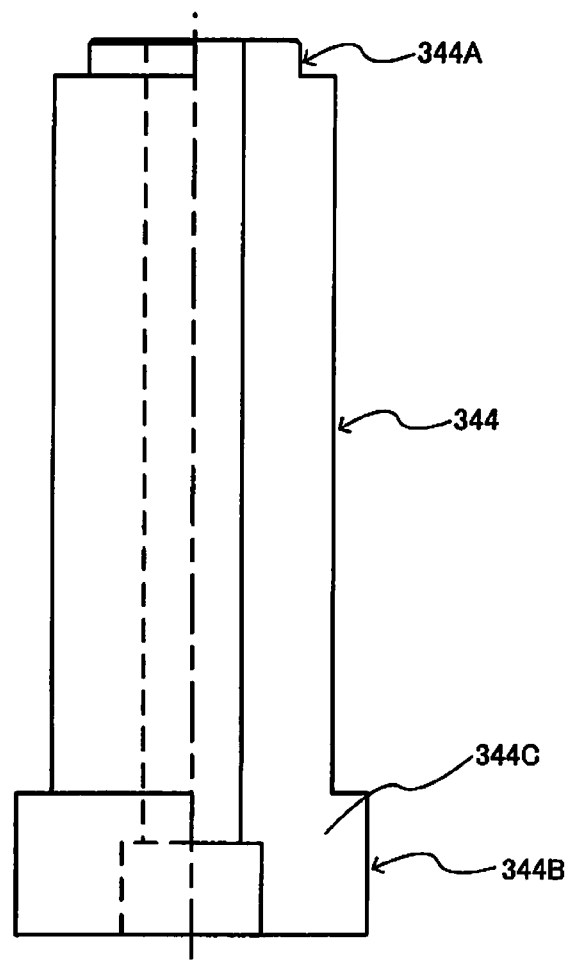
FIG. 27 is a front view illustrating a second shaft.

As illustrated in FIG. 24, two shafts 340 among the four shafts 340 that are positioned on either side in the arrangement direction of the raised-bottom molds 63 may be first shafts 342, and the remaining shafts 340 among the four shafts 340 may be second shafts 344. As illustrated in FIG. 26, the first shaft 342 includes a fixed end 342A that is secured on the third securing plate 330, and a free end 342B, a groove (connection section) 342C being formed in the free end 342B. As illustrated in FIG. 27, the second shaft 344 includes a fixed end 344A that is secured on the third securing plate 330, and a free end 344B, the free end 344B being in the shape of a flange 344C, differing from the free end 342B in which the groove 342C is formed.

Figure 25:
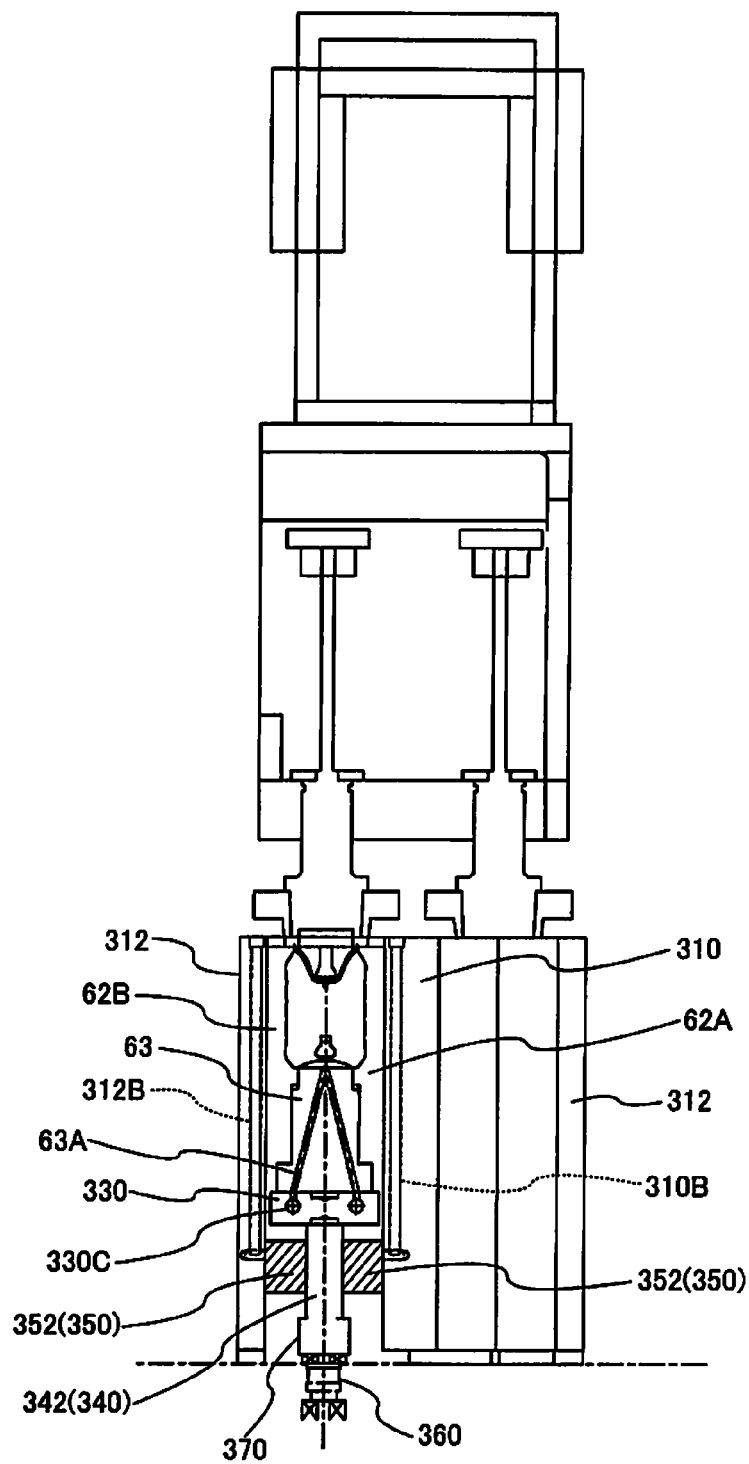
FIG. 25 is a side cross-sectional view illustrating a blow mold unit.
Figure 28C:
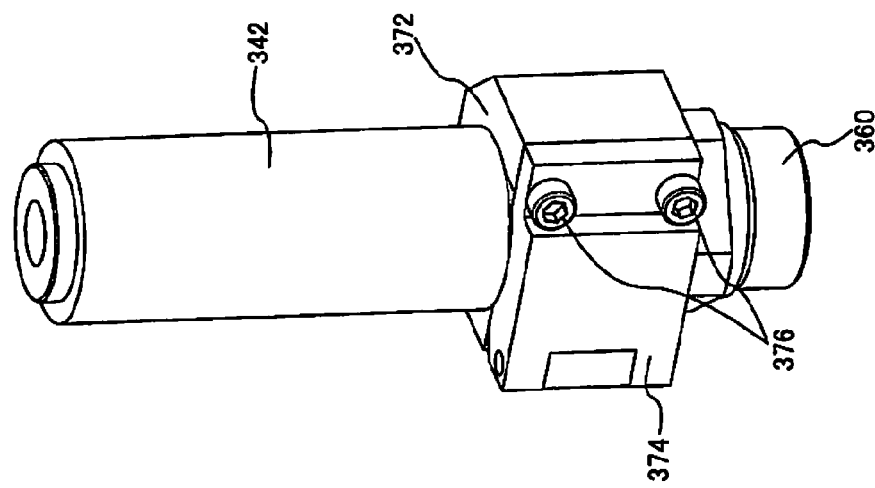
FIG. 28C is a view illustrating a state in which a coupling member is closed.
Figure 28B:
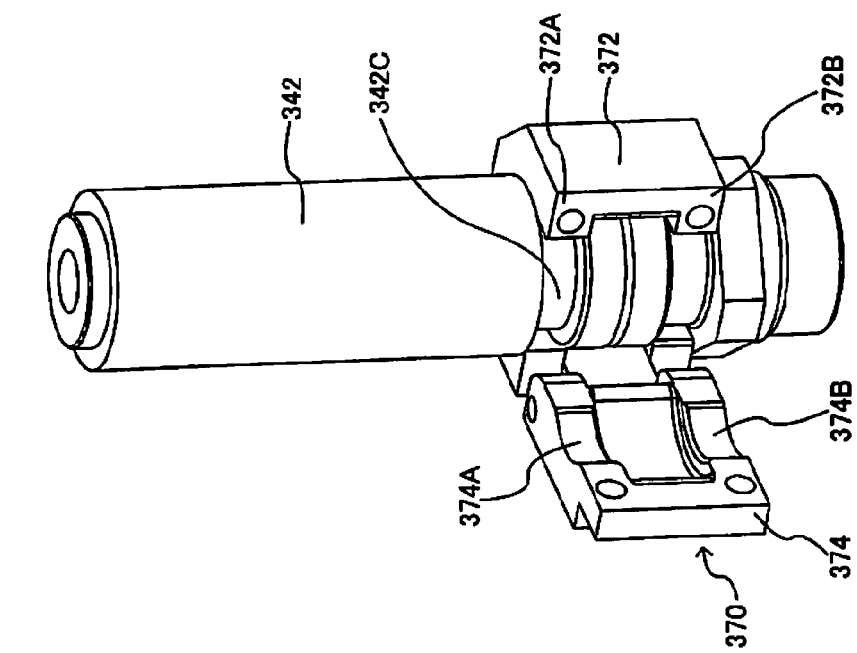
FIG. 28B is a view illustrating a state in which a coupling member is opened.
Figure 28A:
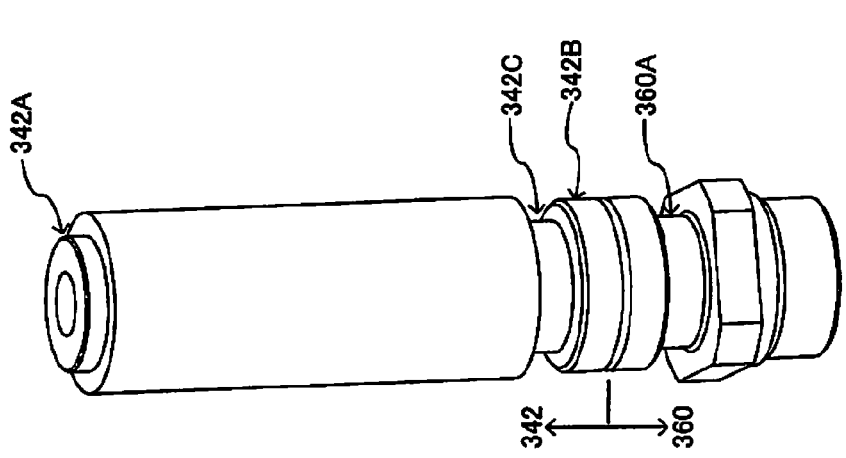
FIG. 28A is a view illustrating a state in which a first shaft and a first connection section come in contact with other.

A first connection section 360 is disposed under the free end 342B of the first shaft 342 (see FIGS. 24, 25, and 28A). A second connection section 362 is disposed under the free end 344B of the second shaft 344 (see FIG. 24). The first connection section 360 and the second connection section 362 are secured on the upper end of four driving rods (not illustrated) of the raised-bottom mold driver section (driver device) 108 illustrated in FIG. 9 by screwing or the like. Therefore, when the driving rods are moved upward by the raised-bottom mold driver section (driver device) 108, the four shafts 340 (342, 344) are moved upward via the first connection section 360 and the second connection section 362, so that the raised-bottom molds 63 secured on the third securing plate 330 can be closed. The four shafts 340 (342, 344) come in contact with the upper end of the four driving rods (not illustrated) of the raised-bottom mold driver section (driver device) 108, and receive pressure when the raised-bottom molds 63 are closed.

When the driving rods are moved downward by the raised-bottom mold driver section (driver device) 108, the raised-bottom molds 63 are moved downward (opened) via the two first shafts 342. A coupling member 370 is provided to couple the first shaft 342 and the first connection section 360.

As illustrated in FIG. 28A, the first connection section 360 coupled by the coupling member 370 includes a connection section (groove) 360A similar to the connection section (groove) 342C of the first shaft 342. The coupling member 370 includes a first coupling section 372, and a second coupling section 374 that can be opened and closed relative to the first coupling section 372 via a hinge section 274, for example. The first coupling section 372 includes a first protrusion section 372A and a second protrusion section 372B that are respectively fitted into the connection section (groove) 342C of the first shaft 342 and the connection section (groove) 360A of the first connection section 360. The second coupling section 374 includes a first protrusion section 374A and a second protrusion section 374B that are respectively fitted into the connection section (groove) 342C of the first shaft 342 and the connection section (groove) 360A of the first connection section 360. The first shaft 342 and the first connection section 360 are coupled by closing the first coupling section 372 and the second coupling section 374, and securing the first coupling section 372 and the second coupling section 374 using bolts 376.

According to the above configuration, since the first shafts 342 can be connected to or disconnected from the upper end of the driving rods using the coupling members 370, the blow mold unit 300 can be easily exchanged. Moreover, the coupling member 370 can be attached and removed on the base if the free ends 342B and 344B of the shafts 340 are always positioned above the lower base 72. When the two first shafts 342 coupled by the coupling members 370 are positioned on either side in the arrangement direction of the raised-bottom molds 36, a sufficient coupling space can be provided on either side in the arrangement direction of the raised-bottom molds 36 (see FIG. 11), so that the workability is improved. In this case, since the second shafts 344 are disposed between the first shafts 342 coupled by the coupling members 370, flexure of the third securing plate 330 can be prevented, so that the accuracy of the height of the raised-bottom molds 36 can be improved. This improves the molding quality of the molded articles 1C.

The free ends 342B and 344B of the shafts 340 (first shafts 342 and second shafts 344) provided in the blow mold unit 300 are always positioned above an upper side level L0 of the lower base 72 of the blow molding apparatus 10. The lowermost side of the blow mold unit 300 is formed by slide plates 310A and 312A that are provided at the lower end of the first securing plate 310 and the second securing plate 312, and slide on the lower base 72 (see FIG. 24). A horizontal level L1 illustrated in FIG. 28A is the position of the lower side of the free ends 342B and 344B of the shafts 340 (first shafts 342 and second shafts 344) in a state in which the raised-bottom molds 36 are moved upward (closed). In this case, the distance ΔL between the horizontal levels L0 and L1 is 30 mm, for example. Since the elevating length of the raised-bottom molds 63 is 10.5 mm, for example, the distance ΔL is 19.5 mm even when the raised-bottom molds 63 are moved downward.

The free ends 342B and 344B of the shafts 340 (first shafts 342 and second shafts 344) are moved to the lowest position when the third securing plate 330 is moved downward to come in contact with the second pressure-receiving plates 350 when attaching or removing the blow mold unit 300 in a state in which the coupling members 370 are removed. In this case, the distance ΔL between the horizontal levels L0 and L1 is 12.5 mm, for example. Therefore, the free ends 342B and 344B of the shafts 340 (first shafts 342 and second shafts 344) are always positioned above the upper side level L0 of the lower base 72 of the blow molding apparatus 10. Specifically, the blow mold unit 300 does not have a member that protrudes downward from the slide plates 310A and 312A that slide on the lower base 72 of the blow molding apparatus 10 when attaching or removing the blow mold unit 300. This makes it possible to attach or remove the blow mold unit 300 by integrally sliding the blow mold unit 300 on the lower base 72 of the blow molding apparatus 10.

As illustrated in FIG. 25, the second pressure-receiving plate 352 among the plurality of second pressure-receiving plates 350 that surrounds the first shaft 342 is formed in the shape of a pair of split molds, one of the pair of split molds being secured on the first securing plate 310, and the other of the pair of split molds being secured on the second securing plate 312. The second pressure-receiving plate 352 receives pressure when the mold is closed in a state in which the opposing sides of the pair of split molds that form the second pressure-receiving plate 352 come in contact with each other. The second pressure-receiving plate 352 does not interfere with the first shaft 342 when the mold is closed due to a clearance section formed in the second pressure-receiving plate 352. As illustrated in FIG. 24, the second pressure-receiving plate 354 among the plurality of second pressure-receiving plates 350 that surrounds the second shaft 344 is integrally formed, and is provided with a bush 356 that surrounds the second shaft 344, the second pressure-receiving plate 354 being secured on the first securing plate 310. The second pressure-receiving plate 354 receives pressure when the mold is closed in a state in which the opposing sides of the second pressure-receiving plate 354 and the second securing plate 312 come in contact with each other.

As illustrated in FIG. 25, a temperature control medium passage 310B may be provided in the first securing plate 310, a temperature control medium passage 312B may be provided in the second securing plate 312, and a temperature control medium passage 330C may be provided in the third securing plate 330. In this case, the first blow cavity split mold 62A and the second blow cavity split mold 62B can be controlled in temperature (e.g., cooled) via the first securing plate 310 and the second securing plate 312. Likewise, the raised-bottom molds 63 can be controlled in temperature (e.g., cooled) via the third securing plate 330. Note that the passage 330C provided in the third securing plate 330 may communicate with a temperature control medium passage 63A provided in the raised-bottom molds 63. The second pressure-receiving plates 350 can also be controlled in temperature (e.g., cooled) via the third securing plate 330. This makes it possible to prevent thermal expansion of the pressure-receiving plates 350, so that adhesion to the shafts 340 can be maintained.

The blow mold unit 300 may include mounting sections 314 (see FIG. 23) by which a temporary securing member (not illustrated) is removably secured, the temporary securing member temporarily securing the two second securing plates 312 and positioning the two second securing plates 312 relative to the first securing plate when attaching or removing the blow mold unit 300 to or from the blow molding apparatus 10. The mounting sections 314 may be bolt holes for securing a plate-shaped temporary securing member (not illustrated) using bolts, for example. The mounting sections 314 may be formed in the two second securing plates 312, or may be formed in a member that is integrally formed with the second securing plate 312. In one embodiment of the invention, the mounting sections 314 are formed in the first pressure-receiving plates 320 respectively secured on the second securing plates 312 (see FIG. 23). The temporary securing member may be attached in a state in which the two second securing plates 312 are closed.

According to the above configuration, the two second securing plates 312 that have been removed from the mold closing/opening device 200 can be positioned relative to the first securing plate 310 when attaching or removing the blow mold unit 300. Therefore, the members of the blow mold unit 300 are integrally secured, so that handling is facilitated.

When the blow mold unit 300 includes only one row of blow mold 60, the blow mold unit 300 may include mounting sections (e.g., bolt holes) for removably securing a temporary securing member that temporarily secures the first securing plate 310 and the second securing plate 312.

Figure 29:
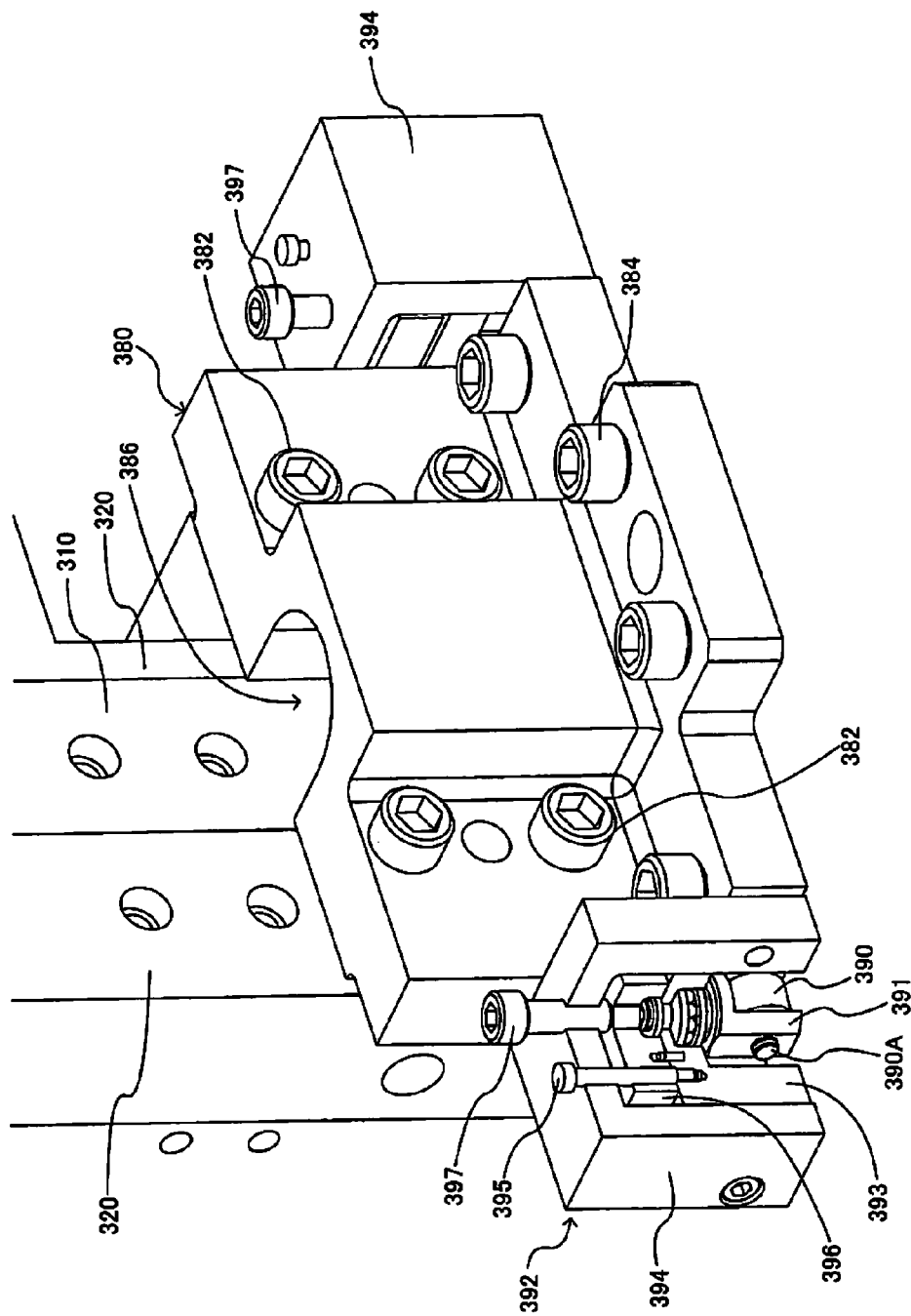
FIG. 29 is an oblique view illustrating a securing block.

As illustrated in FIGS. 23 and 29, the blow mold unit 300 may further include two securing blocks 380 that are secured on the lower base 72. Note that FIGS. 23 and 29 illustrate one securing block 380. The securing blocks 380 are respectively secured on the first pressure-receiving plates 320 that are positioned on either side of the first blow cavity split molds 62A secured on the first securing plate 310 using bolts 382. The securing block 380 allows the two first pressure-receiving plates 320 to be secured on the lower base 72 using bolts 384. Note that the securing block 380 has a clearance hole 386 that allows the driving rod 218A of the P1-P2 pitch change section to pass through.

When opening or closing the blow molds, it is unnecessary to move the first securing plate 310 on which the two first blow cavity split molds 62A are secured in a back-to-back arrangement. Therefore, the first pressure-receiving plates 320 secured on the first securing plate 310 are secured on the lower base 72 of the blow molding apparatus 10 via the two securing blocks 380. This makes it possible to secure the blow mold unit 300 on the blow molding apparatus 10. Note that this structure may also be applied when the blow mold unit 300 does not include the raised-bottom mold.

In one embodiment of the invention, each of the two securing blocks 380 may include a roller 390 that comes in rolling contact with the lower base 72, and a roller driving member 392 that moves the roller 390 downward from an upward position at which the roller 390 does not come in rolling contact with the lower base 72 to a downward position at which the roller 390 comes in rolling contact with the lower base 72. This structure may also be applied when the blow mold unit 300 does not include the raised-bottom mold.

When the roller 390 has been moved downward by the roller driving member 392, and has come in rolling contact with the lower base 72, the blow mold unit 300 can be slid on the lower base 72 by merely pressing the blow mold unit 300, so that burden due to attachment/removal work can be reduced.

The roller 390 is attached to a support 391 that supports a shaft 390 of the roller 390. The roller driving member 392 may include an inner case 393 that supports the support 391, an outer case 394 that surrounds the inner case 393, a first bolt 395 that couples the inner case 393 and the outer case 394, an intermediate plate 396 that is horizontally disposed between the inner case 393 and the outer case 394, and is guided by the first bolt 395 in the vertical direction, and a second bolt 397 that is screwed into the outer case 394, and moves the intermediate plate 396 downward when rotated. When the intermediate plate 396 is moved downward by rotating the second bolt 397, the inner case 393 is moved downward relative to the outer case 394. The roller 390 that is supported by the inner case 393 via the support 391 can thus be moved downward. The external force that moves the roller 390 downward is canceled by rotating the second bolt 397 in the reverse direction, and the roller 390 returns to the previous position due to the weight of the blow mold unit 300.

As illustrated in FIG. 23, the blow mold unit 300 may further include two reinforcing plates 400 (only one reinforcing plate 400 is illustrated in FIG. 23), either end of each of the two reinforcing plates 400 being secured on the outer wall of the two mold closing/opening sections 202 secured on the lower base 72. The middle part of each of the two reinforcing plates 400 may secure the two first pressure-receiving plates 210 on either side of the first blow cavity split molds 62A on the two mold closing/opening sections 202 at a position higher than the two securing blocks 380.

The two reinforcing plates 400 prevent a situation in which the upper end of the two first blow cavity split molds 62A that are secured by the two securing blocks 380 at the lower end falls in the mold opening/closing direction. When closing the blow molds, the two second blow cavity split molds 62B are moved in synchronization using the split mold synchronization member 210. However, the two second blow cavity split molds 62B may not be moved in synchronization due to backlash of a rack and a pinion, for example. If only one of the two second blow cavity split molds 62B is closed in advance relative to the first blow cavity split mold 62A, the upper end of the first blow cavity split mold 62A that is secured only at the lower end may fall. Therefore, a situation in which the first blow cavity split mold 62A falls is prevented using the two reinforcing plates 400. Note that the reinforcing plates 400 are removed when attaching or removing the blow mold unit 300. This structure may also be applied when the blow mold unit 300 does not include the raised-bottom mold.

As illustrated in FIG. 23, a plurality of stoppers 410 may be formed on the upper side of the first securing plate 310 so that the plurality of stoppers 410 protrude from the upper side of the first securing plate 310, the plurality of stoppers 410 restricting the lower limit position of the transfer plates 20A to 20D that transfer the plurality of neck molds 42 that are clamped to the first blow cavity split mold 62A and the second blow cavity split mold 62B.

The plurality of stoppers 410 can implement a function of a lower limit stopper for the transfer plates 20A to 20D and a function that maintains the parallelism of the transfer plates 20A to 20D. If the transfer plates 20A to 20D are tilted or warped in the arrangement direction of the plurality of neck molds 42, the clamping (closing) height of the plurality of neck molds 42 becomes non-uniform, so that the molding quality deteriorates. A stopper that comes in contact with the first securing plate 310 of the blow mold unit 300 in the blow molding station 16 may be provided on the transfer plates 20A to 20D. However, this results in an increase in the number of parts since it is necessary to provide the stoppers to each of the four transfer plates 20A to 20D. Moreover, the stoppers that always protrude from the transfer plates 20A to 20D may interfere with another member when the transfer plates 20A to 20D are moved to the stations 12, 14, and 18 other than the blow molding station 16. It may be possible to improve the accuracy of the height of the first blow cavity split mold 62A and the second blow cavity split mold 62B instead of improving the accuracy of the height of the transfer plates 20A to 20D. However, since the first blow cavity split mold 62A and the second blow cavity split mold 62B are supported on the lower base 72 through a plurality of members such as the first securing plate 310 and the securing block 380, it is easier to improve the accuracy of the height of the transfer plates 20A to 20D.

3.2. Attachment/Removal of Blow Mold Unit

When attaching the blow mold unit 300 to the blow molding apparatus 10, the blow mold unit 300 is placed on the lower base 72 in the direction indicated by the arrow A illustrated in FIG. 11, and then slid. In this case, the reinforcing plates 400 (see FIG. 23) are removed, and the two second securing plates 312 are secured in a closed state using the temporary securing member (not illustrated) and the bolt holes 314. The roller 390 is set to the downward position by rotating the second bolt 397 of the roller driving member 392 (see FIG. 29). This makes it possible to integrally transfer the first blow cavity split molds 62A, the second blow cavity split molds 62B, and the raised-bottom molds 63 (blow mold unit 300) to the blow molding apparatus 10.

The temporary securing member is removed when the blow mold unit 300 has been slid to a given position. The raised-bottom molds 63 are then coupled to the raised-bottom mold driver section (driver device) 108, for example. The coupling member 370 is disposed as illustrated in FIG. 28B, and closed as illustrated in FIG. 28C. This work can be performed at a convenient position on either end of the blow mold unit 300 in the longitudinal direction. Moreover, since the first shaft 342 coupled by the coupling member 370 is positioned above the lower base 72 of the blow molding apparatus 10, the coupling work is further facilitated.

As illustrated in FIG. 29, the two securing blocks 380 are secured on the lower base 72 using the bolts 384. The two second securing plates 312 are then connected to the two mold closing plates 208. The reinforcing plates 400 are then secured as illustrated in FIG. 23. The blow mold unit 300 can thus be attached to the blow molding apparatus 10. Note that the above attachment process is merely an example. The order of the steps may be arbitrarily changed. The blow mold unit 300 may be removed from the blow molding apparatus 10 by performing the above steps in the reverse order.

Although only some embodiments of the invention have been described in detail above, those skilled in the art would readily appreciate that many modifications are possible in the embodiments without materially departing from the novel teachings and advantages of the invention. Accordingly, such modifications are intended to be included within the scope of the invention. Any term cited with a different term having a broader meaning or the same meaning at least once in the specification and the drawings can be replaced by the different term in any place in the specification and the drawings.

The invention may be applied to a horizontal transfer blow molding apparatus instead of a rotary transfer blow molding apparatus.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A blow mold unit that is secured on a base of a blow molding apparatus, the blow mold unit comprising:
   a blow mold that includes a first blow cavity split mold, a second blow cavity split mold, and a plurality of raised-bottom molds, the first blow cavity split mold and the second blow cavity split mold being closed so that a parting surface of the first blow cavity split mold and a parting surface of the second blow cavity split mold come in contact with each other, and the plurality of raised-bottom molds respectively defining a raised-bottom shape in a plurality of cavities defined by the first blow cavity split mold and the second blow cavity split mold;
   a first securing member on which the first blow cavity split mold is secured;
   a second securing member on which the second blow cavity split mold is secured;
   a plurality of first pressure-receiving members, the plurality of first pressure-receiving members being respectively disposed on either side of the first blow cavity split mold and either side of the second blow cavity split mold, and being respectively secured on the first securing member and the second securing member;
   a third securing member that is disposed between the first securing member and the second securing member, the plurality of raised-bottom molds being secured on a first side of the third securing member;
   a plurality of shafts that are suspended from a second side of the third securing member that is opposite to the first side, a lower end of each of the plurality of shafts being a free end; and
   a plurality of second pressure-receiving members that are secured on the first securing member and the second securing member at a position below the third securing member.

2. The blow mold unit as defined in claim 1, further comprising:
   a slide member that slides on the base being secured on a lower end of each of the first securing member and the second securing member, and
   the free ends of the plurality of shafts being positioned above a horizontal height position of a lower side of the slide member in a state in which the third securing member comes in contact with the plurality of second pressure-receiving members.

3. The blow mold unit as defined in claim 1, further comprising:
a connection section being formed in the free ends of two shafts among the plurality of shafts, the connection section being coupled by a coupling member to an upper end of a bottom mold driving rod that protrudes from the base.

4. The blow mold unit as defined in claim 3,
two second pressure-receiving members among the plurality of second pressure-receiving members that respectively surround the two shafts being formed in a shape of a pair of split molds that are respectively secured on the first securing member and the second securing member, and including a clearance section that prevent interference with the two shafts when the first blow cavity split mold and the second blow cavity split mold are closed, and
two second pressure-receiving members among the plurality of second pressure-receiving members that respectively surround remaining shafts among the plurality of shafts other than the two shafts being secured on one of the first securing member and the second securing member, and being provided with a bush that surrounds a shaft among the remaining shafts.

5. The blow mold unit as defined in claim 1,
the blow mold being formed by two rows of blow molds, each of the two rows of blow molds including the first blow cavity split mold and the second blow cavity split mold that are closed so that the parting surface of the first blow cavity split mold and the parting surface of the second blow cavity split mold come in contact with each other, and the plurality of raised-bottom molds,
the first blow cavity split molds of the two rows of blow molds being secured on the first securing member in a back-to-back arrangement, and
two of the second securing members being respectively provided corresponding to each of the second blow cavity split molds of the two rows of blow molds.

6. The blow mold unit as defined in claim 5, further comprising:
a mounting section by which a temporary securing member is removably secured, the temporary securing member temporarily securing the two second securing members and positioning the two second securing members relative to the first securing member when attaching or removing the blow mold unit to or from the blow molding apparatus.

7. The blow mold unit as defined in claim 5, further comprising:
two securing blocks that are secured on the base,
the two securing blocks being respectively secured on two first pressure-receiving members among the plurality of first pressure-receiving members that are positioned on either side of the first blow cavity split molds secured on the first securing member, and each of the two securing blocks securing the two first pressure-receiving members on the base.

8. The blow mold unit as defined in claim 7,
each of the two securing blocks including a roller that comes in rolling contact with the base, and a roller driving member that moves the roller downward from an upward position at which the roller does not come in rolling contact with the base to a downward position at which the roller comes in rolling contact with the base.

9. The blow mold unit as defined in claim 7, further comprising:
two reinforcing members, either end of each of the two reinforcing members being secured on an outer wall of two mold closing/opening sections secured on the base,
a middle part of each of the two reinforcing members securing the two first pressure-receiving members on either side of the first blow cavity split molds on the two mold closing/opening sections at a position higher than the two securing blocks.

10. A blow mold unit that is secured on a base of a blow molding apparatus, the blow mold unit comprising:
two rows of blow molds that respectively include a first blow cavity split mold and a second blow cavity split mold, the first blow cavity split mold and the second blow cavity split mold being closed so that a parting surface of the first blow cavity split mold and a parting surface of the second blow cavity split mold come in contact with each other;
a first securing member on which the first blow cavity split molds of the two rows of blow molds are secured in a back-to-back arrangement;
two second securing members on which the second blow cavity split molds of the two rows of blow molds are respectively secured;
a plurality of first pressure-receiving members, the plurality of first pressure-receiving members being respectively disposed on either side of either of the first blow cavity split molds of the two rows of blow molds or either side of either of the second blow cavity split molds of the two rows of blow molds, and being respectively secured on the first securing member or either of the two second securing members; and
two securing blocks that are secured on the base,
the two securing blocks being respectively secured on two first pressure-receiving members among the plurality of first pressure-receiving members that are positioned on either side of the first blow cavity split molds secured on the first securing member, and each of the two securing blocks securing the two first pressure-receiving members on the base,
each of the two securing blocks including a roller that comes in rolling contact with the base, and a roller driving member that moves the roller downward from an upward position at which the roller does not come in rolling contact with the base to a downward position at which the roller comes in rolling contact with the base.

11. A blow mold unit that is secured on a base of a blow molding apparatus, the blow mold unit comprising:
two rows of blow molds that respectively include a first blow cavity split mold and a second blow cavity split mold, the first blow cavity split mold and the second blow cavity split mold being closed so that a parting surface of the first blow cavity split mold and a parting surface of the second blow cavity split mold come in contact with each other;
a first securing member on which the first blow cavity split molds of the two rows of blow molds are secured in a back-to-back arrangement;
two second securing members on which the second blow cavity split molds of the two rows of blow molds are respectively secured;
a plurality of first pressure-receiving members, the plurality of first pressure-receiving members being respectively disposed on either side of either of the first blow cavity split molds of the two rows of blow molds or either side of either of the second blow cavity split molds of the two rows of blow molds, and being respectively secured on the first securing member or either of the two second securing members;

two securing blocks that are secured on the base, two reinforcing members, either end of each of the two reinforcing members being secured on an outer wall of two mold closing/opening sections secured on the base, and a middle part of each of the two reinforcing members securing the two first pressure-receiving members on either side of the first blow cavity split molds on the two mold closing/opening sections at a position higher than the two securing blocks, the two securing blocks being respectively secured on two first pressure-receiving members among the plurality of first pressure-receiving members that are positioned on either side of the first blow cavity split molds secured on the first securing member, and each of the two securing blocks securing the two first pressure-receiving members on the base.

12. A blow molding apparatus comprising:

a base;

a blow mold unit that is secured on the base, the blow mold unit including a blow mold that includes a first blow cavity split mold, a second blow cavity split mold, and a plurality of raised-bottom molds, the first blow cavity split mold and the second blow cavity split mold being closed so that a parting surface of the first blow cavity split mold and a parting surface of the second blow cavity split mold come in contact with each other, and the plurality of raised-bottom molds respectively defining a raised-bottom shape in a plurality of cavities defined by the first blow cavity split mold and the second blow cavity split mold, a first securing member on which the first blow cavity split mold is secured.

a second securing member on which the second blow cavity split mold is secured, a plurality of first pressure-receiving members, the plurality of first pressure-receiving members being respectively disposed on either side of the first blow cavity split mold and either side of the second blow cavity split mold, and being respectively secured on the first securing member and the second securing member, a third securing member that is disposed between the first securing member and the second securing member, the plurality of raised-bottom molds being secured on a first side of the third securing member, a plurality of shafts that are suspended from a second side of the third securing member that is opposite to the first side, a lower end of each of the plurality of shafts being a free end, and a plurality of second pressure-receiving members that are secured on the first securing member and the second securing member at a position below the third securing member;

a mold closing/opening device that is provided on the base, and drives the first securing member and the second securing member of the blow mold unit to close or open the first blow cavity split mold and the second blow cavity split mold; and a driver device that is provided under the base, and drives the third securing member of the blow mold unit via the plurality of shafts to move the plurality of raised-bottom molds of the blow mold unit upward and downward.

13. A blow molding apparatus comprising:

a base;

a blow mold unit that is secured on the base, the blow mold unit including a blow mold that includes a first blow cavity split mold, a second blow cavity split mold, and a plurality of raised-bottom molds, the first blow cavity split mold and the second blow cavity split mold being closed so that a parting surface of the first blow cavity split mold and a parting surface of the second blow cavity split mold come in contact with each other, and the plurality of raised-bottom molds respectively defining a raised-bottom shape in a plurality of cavities defined by the first blow cavity split mold and the second blow cavity split mold, a first securing member on which the first blow cavity split mold is secured, a second securing member on which the second blow cavity split mold is secured, a plurality of first pressure-receiving members, the plurality of first pressure-receiving members being respectively disposed on either side of the first blow cavity split mold and either side of the second blow cavity split mold, and being respectively secured on the first securing member and the second securing member, a third securing member that is disposed between the first securing member and the second securing member, the plurality of raised-bottom molds being secured on a first side of the third securing member, a plurality of shafts that are suspended from a second side of the third securing member that is opposite to the first side, a lower end of each of the plurality of shafts being a free end, and a plurality of second pressure-receiving members that are secured on the first securing member and the second securing member at a position below the third securing member, the blow mold being formed by two rows of blow molds, each of the two rows of blow molds including the first blow cavity split mold and the second blow cavity split mold that are closed so that the parting surface of the first blow cavity split mold and the parting surface of the second blow cavity split mold come in contact with each other, and the plurality of raised-bottom molds, the first blow cavity split molds of the two rows of blow molds being secured on the first securing member in a back-to-back arrangement, and two of the second securing members being respectively provided corresponding to each of the second blow cavity split molds of the two rows of blow molds;

a mold closing/opening device that is provided on the base, and drives the two second securing members of the blow mold unit to close or open the first blow cavity split molds and the second blow cavity split molds of the two rows of blow molds; and a driver device that is provided under the base, and drives the third securing member of the blow mold unit via the plurality of shafts to move the plurality of raised-bottom molds of the blow mold unit upward and downward.

14. A blow molding apparatus comprising:

a base;

a blow mold unit that is secured on the base, the blow mold unit including two rows of blow molds that respectively include a first blow cavity split mold and a second blow cavity split mold, the first blow cavity split mold and the second blow cavity split mold being closed so that a parting surface of the first blow cavity split mold and a parting surface of the second blow cavity split mold come in contact with each other, a first securing member on which the first blow cavity split molds of the two rows of blow molds are secured in a back-to-back arrangement, two second securing members on which the second blow cavity split molds of the two rows of blow molds are respectively secured, a plurality of first pressure-receiving members, the plurality of first pressure-receiving members being respectively disposed on either side of either of the first blow cavity split molds of the two rows of blow molds or either side of either of the second blow cavity split molds of the two rows of blow molds, and being respectively secured on the first securing member or either of the two second securing members, and two securing blocks that are secured on the base, the two securing blocks being respectively secured on two first pressure-receiving members among the plurality of first pressure-receiving members that are positioned on either side of the first blow cavity split molds secured on the first securing member, and each of the two securing blocks securing the two first pressure-receiving members on the base, each of the two securing blocks including a roller that comes in rolling contact with the base, and a roller driving member that moves the roller downward from an upward position at which the roller does not come in rolling contact with the base to a downward position at which the roller comes in rolling contact with the base;

a mold closing/opening device that is provided on the base, and drives the two second securing members of the blow mold unit to close or open the first blow cavity split molds and the second blow cavity split molds of the two rows of blow molds.

15. A blow molding apparatus comprising:

a base;

a blow mold unit that is secured on the base, the blow mold unit including two rows of blow molds that respectively include a first blow cavity split mold and a second blow cavity split mold, the first blow cavity split mold and the second blow cavity split mold being closed so that a parting surface of the first blow cavity split mold and a parting surface of the second blow cavity split mold come in contact with each other, a first securing member on which the first blow cavity split molds of the two rows of blow molds are secured in a back-to-back arrangement;

two second securing members on which the second blow cavity split molds of the two rows of blow molds are respectively secured, a plurality of first pressure-receiving members, the plurality of first pressure-receiving members being respectively disposed on either side of either of the first blow cavity split molds of the two rows of blow molds or either side of either of the second blow cavity split molds of the two rows of blow molds, and being respectively secured on the first securing member or either of the two second securing members, two securing blocks that are secured on the base, two reinforcing members, either end of each of the two reinforcing members being secured on an outer wall of two mold closing/opening sections secured on the base, and a middle part of each of the two reinforcing members securing the two first pressure-receiving members on either side of the first blow cavity split molds on the two mold closing/opening sections at a position higher than the two securing blocks, the two securing blocks being respectively secured on two first pressure-receiving members among the plurality of first pressure-receiving members that are positioned on either side of the first blow cavity split molds secured on the first securing member, and each of the two securing blocks securing the two first pressure-receiving members on the base; and a mold closing/opening device that is provided on the base, and drives the two second securing members of the blow mold unit to close or open the first blow cavity split molds and the second blow cavity split molds of the two rows of blow molds.

* * * * *